US010906824B2

(12) United States Patent
Harris

(10) Patent No.: US 10,906,824 B2
(45) Date of Patent: Feb. 2, 2021

(54) OZONE-ASSISTED FLUID TREATMENT APPARATUS AND METHOD

(71) Applicant: Charles E. C. Harris, Chiang Rai (TH)

(72) Inventor: Charles E. C. Harris, Chiang Rai (TH)

(*) Notice: Subject to any disclaimer, the term of this patent is extended or adjusted under 35 U.S.C. 154(b) by 348 days.

(21) Appl. No.: 16/112,708

(22) Filed: Aug. 25, 2018

(65) Prior Publication Data

US 2018/0362374 A1 Dec. 20, 2018

Related U.S. Application Data

(63) Continuation-in-part of application No. 15/269,966, filed on Sep. 19, 2016, now Pat. No. 10,414,677.

(60) Provisional application No. 62/552,853, filed on Aug. 31, 2017, provisional application No. 62/220,142, filed on Sep. 17, 2015.

(51) Int. Cl.
| | |
|---|---|
| *C02F 1/00* | (2006.01) |
| *C02F 1/32* | (2006.01) |
| *C02F 1/78* | (2006.01) |
| C02F 103/42 | (2006.01) |
| C02F 101/20 | (2006.01) |
| C02F 101/10 | (2006.01) |

(52) U.S. Cl.
CPC ............ *C02F 1/78* (2013.01); *C02F 1/001* (2013.01); *C02F 1/32* (2013.01); *C02F 2101/101* (2013.01); *C02F 2101/203* (2013.01); *C02F 2101/206* (2013.01); *C02F 2103/42* (2013.01); *C02F 2209/40* (2013.01); *C02F 2209/42* (2013.01); *C02F 2303/04* (2013.01); *C02F 2303/18* (2013.01)

(58) Field of Classification Search
CPC .... C02F 1/001; C02F 1/32; C02F 1/78; C02F 2101/101; C02F 2101/203; C02F 2101/206; C02F 2103/42; C02F 2209/40; C02F 2209/42; C02F 2303/04; C02F 2303/18
See application file for complete search history.

(56) References Cited

U.S. PATENT DOCUMENTS

| | | |
|---|---|---|
| 3,692,180 A | 9/1972 | LaRaus |
| 5,037,550 A | 8/1991 | Montagnon et al. |
| 5,071,550 A | 12/1991 | Bernhardt |
| 5,190,648 A | 3/1993 | Ramsauer |
| 5,641,399 A | 6/1997 | Rawlins |
| 5,695,635 A | 12/1997 | Sasaki et al. |
| 5,711,887 A | 1/1998 | Gastman et al. |
| 5,925,320 A | 7/1999 | Jones |

(Continued)

*Primary Examiner* — Lucas A Stelling
(74) *Attorney, Agent, or Firm* — Bartels Law Group

(57) ABSTRACT

An apparatus and method for ozone-aerating fluid is connected to a conventional water treatment system that includes a high pressure fluid pump and a high pressure filter connected to a main reservoir. Included is an auxiliary reservoir and low pressure filter. A first valve controls the fluid flow in a conduit connected to the output of the high pressure filter. A second valve controls the flow of fluid output from the filter to a lift tube. Ozonated air bubbles are injected into fluid in the lift tube. The fluid flows up the lift tube and into the auxiliary reservoir due to expansion of air bubbles. The fluid flows out of the auxiliary reservoir and filter under the force of gravity into the conduit on the downstream side of the first valve and into the main reservoir. A UV germicidal lamp may be positioned in the path of fluid flow.

21 Claims, 17 Drawing Sheets

(56) References Cited

U.S. PATENT DOCUMENTS

| | | |
|---|---|---|
| 6,939,397 B2 | 9/2005 | Nelsen et al. |
| 8,470,170 B2 | 6/2013 | Harris |
| 8,753,523 B2 | 6/2014 | Harris |
| 9,316,011 B2 | 4/2016 | Harris |
| 2004/0226893 A1 | 11/2004 | Kamimura |
| 2005/0163648 A1 | 7/2005 | Liang |
| 2007/0248488 A1 | 10/2007 | Denkewicz |
| 2010/0085691 A1 | 4/2010 | Yeh et al. |
| 2014/0209521 A1 | 7/2014 | Harris |
| 2014/0299525 A1* | 10/2014 | Harris ................. C02F 1/001 210/86 |
| 2016/0122208 A1 | 5/2016 | Denkewicz et al. |

* cited by examiner

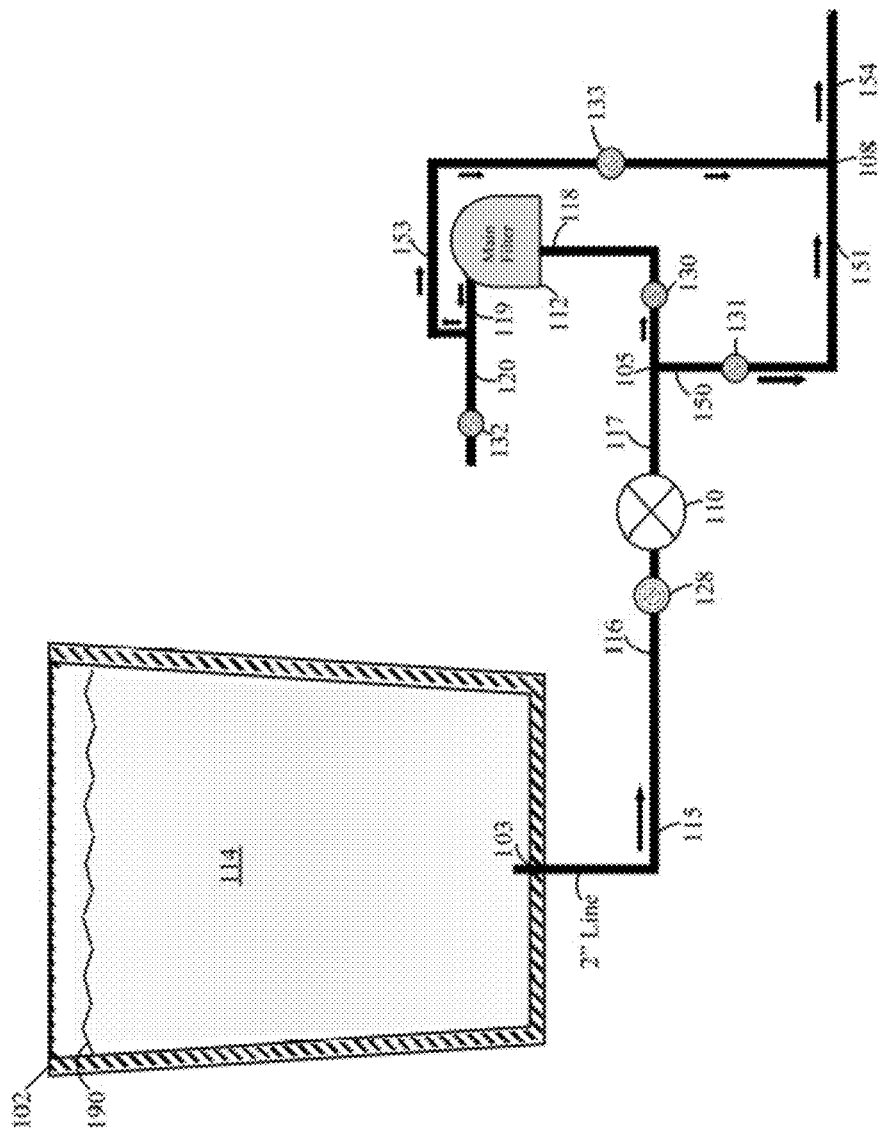

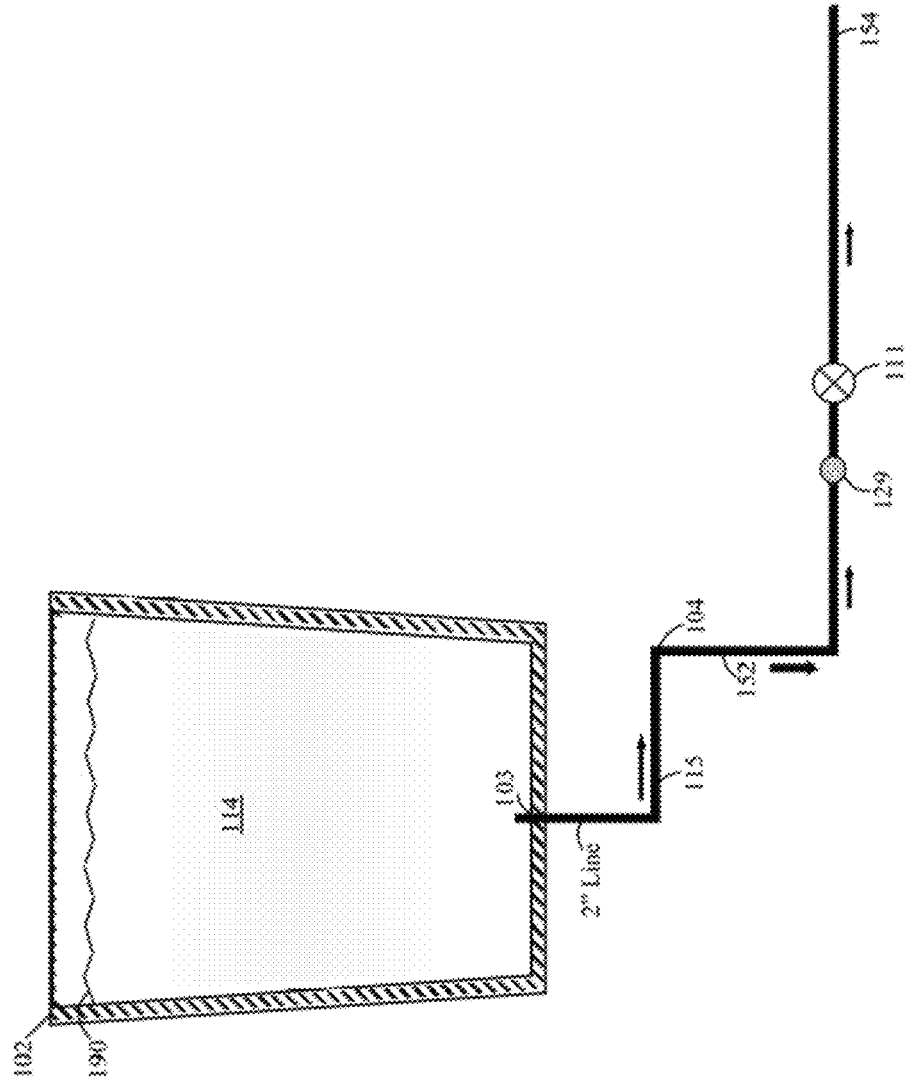

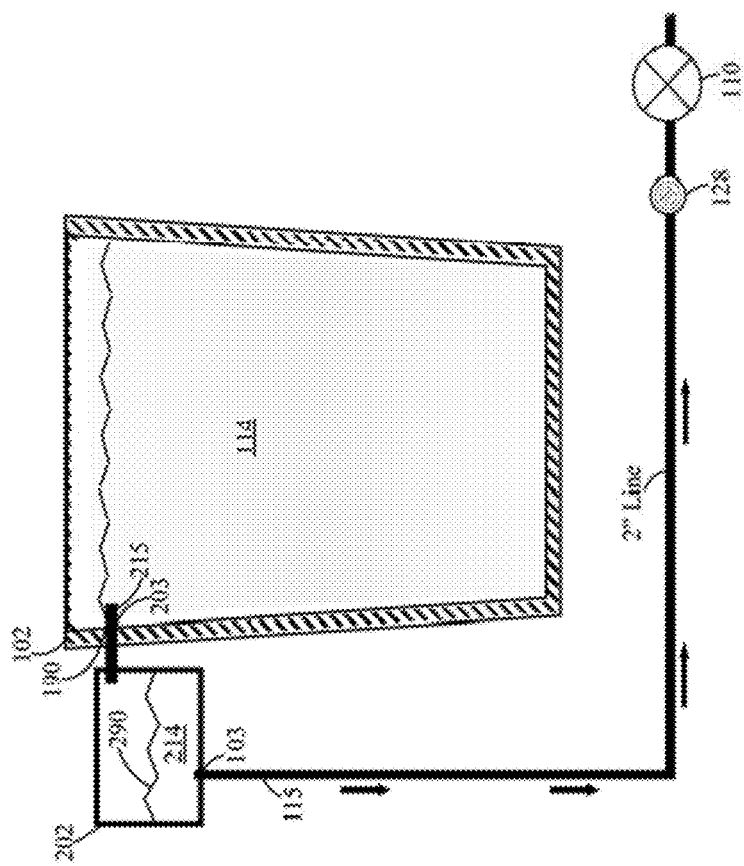

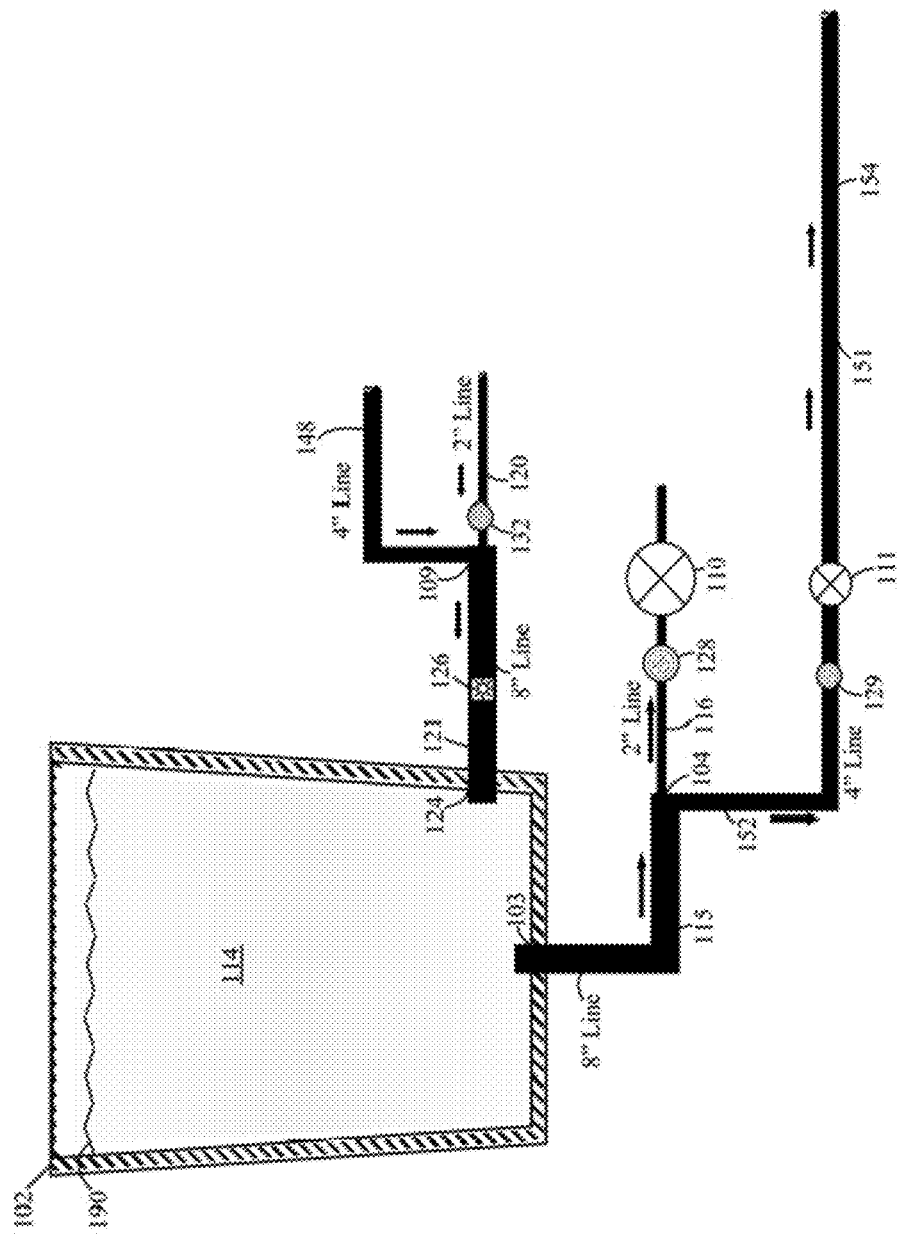

OZONE-ASSISTED FLUID TREATMENT APPARATUS AND METHOD

PRIORITY

The present application claims priority to U.S. Provisional Patent Application Ser. No. 62/552,853, filed Aug. 31, 2017, the entirety of which is incorporated herein by reference. The present application is a continuation-in-part of, and claims priority to U.S. patent application Ser. No. 15/269,966, filed Sep. 19, 2016, now U.S. Pat. No. 10,414,677, the entirety of which is incorporated herein by reference. U.S. patent application Ser. No. 15/269,966 claims priority to U.S. Provisional Patent Application Ser. No. 62/220,142, filed Sep. 17, 2015, the entirety of which is incorporated herein by reference.

FIELD OF THE INVENTION

This invention relates in general to fluid treatment systems and methods, and more specifically to apparatus for treating fluid from a fluid reservoir by injecting ozonated air into such fluid from the fluid reservoir and the subsequent irradiation of the ozonated fluid by a UV lamp, so that ozone, assisted by advanced oxidation products (AOPs) disinfection, can be safely used for primary disinfection of the fluid in the fluid reservoir without other primary or secondary disinfectants such as chlorine, under situations where the apparatus shares existing inlets, outlets, and conduits with a conventional pressure fluid pump circulation and filtration system which otherwise, without this invention, would inhibit or prevent the apparatus from functioning properly and/or prevent the apparatus from operating simultaneously with such conventional pressure fluid pump.

BACKGROUND

Ozone ($O_3$) is a gas with strong oxidation properties that has been used in many applications including the pool and spa industry as well as treating water in water storage tanks since the early 1900's. Ozone is typically produced by high-intensity ultraviolet (UV) light or by a high-voltage electric field. The normal byproduct of ozone is oxygen ($O_2$). Ozone is created when either UV light or a corona discharge (CD) is applied to oxygen. The oxygen disassociates into single oxygen atoms which recombine into ozone. Ozone has a half-life of about 2 to 12 hours in air and about 20 minutes when dissolved in water. Ozone is 13 times more soluble in water than oxygen. Ozone oxidizes and disinfects and deodorizes. Ozone also micro-flocculates iron and manganese and kills bacteria 3,000 times faster than chlorine, kills viruses, algae spores, and some parasites, precipitates heavy metals, controls formation of scales, and oxidizes oils.

Ozone is typically introduced into water to be treated by simply bubbling ozone and air into a tank of water with the use of a diffuser stone (known as an ozone aeration system) or by a venturi eductor used in conjunction with a water pump. Passing water through a venturi eductor creates a suction which draws in ozone and mixes the ozone gas with water. The ozone gas is typically introduced into a contact tank from which undissolved ozone gas is vented, or it is introduced directly into a storage tank and bubbles up through the tank and out the top of the tank. This same type of system has been used to inject ozone into water in swimming pools and spas. In some cases, spa systems have used existing "spa hydrotherapy jets" as the means to "suck in" the ozone gas and mix the gas with the spa water.

Ozone is used in combination with various chemicals in the pool and, spa industry. Ozone is also used to treat iron, manganese, and hydrogen sulfide in well water and to kill pathogens in surface waters such as lakes and streams. Ozone systems come in many varieties and ozone is produced in many ways known in the art.

Ozone water treatment systems for water storage tanks are designed to clean "raw" water, e.g., well water, whereas systems for pools and spas are designed to keep treated water clean as it is used over and over again. Prior art ozone aeration systems typically include a filter to remove impurities in a reservoir of water. One prior art system teaches a water purification apparatus suspended inside a water tank. The apparatus includes a filter for filtering the water and a lift tube containing ozonated air bubbles to add ozone to the water in the tank. Such a prior art system is disclosed in U.S. Pat. No. 5,190,648 to Ramsauer, issued Mar. 2, 1993. In the Ramsauer type of system, an ultraviolet (UV) ozone generator utilizes UV light at a nanometer wavelength of 185 that shines on feed gas (air or concentrated oxygen) flowing through a suitable tube chamber. The ozone is injected into the water in an airstream and the airstream causes the water to flow upwardly in the lift tube and circulate from the reservoir through the lift tube fir purification. Fundamentally, UV generator mimics the natural process responsible for the production of the ozone layer in the earth's outer atmosphere. In the stratosphere, high-energy UV radiation from the sun splits diatomic oxygen that results in ozone formation. Ozone generators based on UV radiation typically produce relatively small amounts of ozone at a very low concentration.

In the Ramsauer system, air containing ozone generated by an ozone generator is injected into the bottom of the lift tube using a diffuser, which causes the ozonated air to be converted into bubbles. The ozonated air bubbles up through the water in the lift tube and into the water tank. Excess ozonated air escapes through the top of the tank. As taught in Ramsauer, the lift tube is part of an in-the-tank filter module. The ozone gas mixing and filtration and circulation of the water are accomplished within the filter module assembly. The action of the bubbles rising and expanding in the lift tube causes a current flow, which causes the water to be drawn through the filter where the water is filtered with each pass to thereby filter the water prior to its contact with the ozonated air.

Prior art ozone water treatment systems are generally simple to install since they are positioned inside the fluid reservoir and therefore require no cutting into the wall of reservoir, whether it be a pool, spa, or tank, to install separate lines. However, such a "single" reservoir fluid treatment system is more difficult to maintain, because the filter needs to be pulled from the reservoir for cleaning and maintenance. In addition, the Ramsauer system, for example, does not treat the excess ozonated air bubbles emanating from the fluid in the reservoir after treatment, for destruction or to channel it elsewhere for some other use. There is no mechanism for preventing the pool or spa user from being exposed to this ozonated air bubbling off the surface of the water, and thus having to suffer the damaging effects of ozone on the user's mucus membranes, eyes, and skin.

In the prior art, an alternative method for treating water to remove pathogens is to use UV germicidal lamps in disinfection water treatment systems. In such systems, the UV lamp is placed in a flow of water to expose pathogens to UV radiation. These lamps use a different frequency of the electro-magnetic spectrum than is used with UV ozone producing lamps. The optimum wavelength to effectively inactivate microorganisms, according to the prior art, is in the range of 250 to 270 nm. The intensity of the radiation emitted by the lamp dissipates as the distance from the lamp increases.

According to Wikipedia, "UV light is electromagnetic radiation with wavelengths shorter than visible light. UV can be separated into various ranges, with short-wavelength UV (UVC) considered 'germicidal UV.' At certain wavelengths, UV is mutagenic to bacteria, viruses and other microorganisms. Particularly at wavelengths around 250 nm-260 nm, UV breaks molecular bonds within micro-organismal DNA, producing thymine dimers that can kill or disable the organisms." See, https://en.wikipedia.org/wiki/Ultraviolet_germicidal_irradiation.

Many companies offer UV disinfection system for the pool and spa industry. For example, a company called Spectra Light UV sells UV germicidal systems for pools. It states on its website: "Ultraviolet (UV) pool sanitizers utilize a cutting-edge, non-chemical process that uses germicidal UV light rays to sanitize water, air and surfaces that may be contaminated. UV pool sanitizers emit a high intensity germicidal light ray that alters or disrupts the DNA or RNA of targeted organisms such as algae, bacteria, viruses, cysts and protozoa. The highly concentrated electromagnetic energy also destroys organic matter, eliminating the formation of dangerous chlorine by-products. The UV light spectrum was discovered with the identification of light waves. Scientists have known for almost a century that UV is a powerful neutralizer of algae, bacteria and viruses. They also discovered that the optimal ultraviolet wavelength to destroy microorganisms was between 250 and 270 nm. The results led scientists to incorporate UV sanitizer technology into sterilizing drinking water more than 30 years ago. Ultraviolet disinfection has since gained in popularity in drinking water and wastewater disinfection in the last 10 years. Now UV sanitizers disinfect a significant percentage of all drinking and wastewater. Typical germicidal UV sanitizers bombard the passing water flow with a high intensity germicidal ultraviolet ray that destroys more than 60 waterborne pathogens, including algae, bacteria, cysts, and viruses. The UV sanitizing lamp is housed in an industrial graphite housing optimized for high flow rates. A highly specialized quartz glass sleeve protects the lamp from passing water while transmitting 99.9% of the UV light. The highly concentrated electromagnetic energy destroys organic matter and eliminates the formation of dangerous chlorine by-products called chloramines that commonly lead to red, stinging eyes, skin irritations, asthma and allergies. This energy penetrates the cell walls of bacteria, viruses, algae, cysts and all pathogens," See, http://www.spectralightuv.com/how-uv-works.

Using a system to inject ozone into the water and then, downstream, using a UV germicidal UV lamp for water purification is known in the art. This type of system has many advantages and data shows that the advantages are greater than what might be expected. This is because the use of injecting ozone into the water first and then shining UV radiation makes advanced oxidation products (AOPs). AOPs can achieve greater water treatment results than either ozone or UV disinfection alone. Many writers have recommended using combining ozone and UV technologies to form AOPs for all recreational waters because they form such a powerful oxidizer. Microbial inactivation studies employing a combination of UV and ozone have been reported for decades in water treatment. These studies have been made almost exclusively in non-swimming pool applications, so less notice may have been taken of them within the pool and spa industry. In these research investigations, which span multiple water treatment applications, researchers observed a synergistic effect when UV and ozone were used in combination for disinfection and oxidation purposes. That is to say, the observed results were greater than the expected contributions of their parts. The synergistic action, as observed by many investigators, has been attributed to the formation of hydroxyl radicals when UV light interacts with ozone. The use of hydroxyl radicals in water treatment is commonly referred to in scientific literature as advanced oxidation. The potent nature of hydroxyl radicals results in what is effectively a one-two-three punch when UV and ozone are used together.

See, e.g., a study published in 2006 by Magbanua, et al. According to Magbanua, et at, the synergy associated with UV/ozone water treatment is attributed to the presence of supplementary hydroxyl radicals. In pure water, ozone reacts with hydroxide ions to form hydroxyl ions via a complicated pathway. The combined use of UV and ozone promotes the formation of additional hydroxyl radicals by photolysis of ozone through a hydrogen peroxide pathway.

As found in Magbanua, et al., aqueous ozone absorbs UV radiation at wavelengths of 200 to 310 nm, and, in turn, decomposes to form hydrogen peroxide. Hydrogen peroxide then further reacts with UV to produce hydroxyl radicals. Hydroxyl radicals are extremely fast-reacting, potent, non-selective chemical species. In fact, their oxidation power is recognized as being far more potent than chlorine gas, hypochlorous acid or ozone. Furthermore, the reactivity of hydroxyl radicals has long been recognized as extremely fast in some instances as much as 1 million times faster-acting than ozone for bond breaking via chemical oxidation. For these reasons, the inactivation rate of waterborne pathogens is much greater due to the additional oxidizing power provided by the supplemental hydroxyl radicals.

The trio of UV, ozone, and hydroxyl radicals ("the trio") have been found to be effective for water treatment. This dual technology approach, commonly referred to as advanced oxidation, has the capability of achieving oxidation and disinfection. In addition to the research by Magbanua, et al., the combined effects of UV, ozone, and hydroxyl radicals as disinfectants were demonstrated in work performed at the University of Arizona's Water Quality Center under a grant sponsored by the U.S. Department of Homeland Security. In that research, the disinfection performance of UV and ozone against adenovirus and *Naegleria fowleri* was shown to be remarkably improved when paired together. Importantly, this study established the synergistic effect of UV and ozone against viruses and amoebas, augmenting prior results against bacteria and parasites. Taken together, the potency of a UV/ozone combination as a disinfection approach seems unparalleled.

The trio as Oxidizers: The benefits of pairing UV with ozone do not stop with disinfection performance. While UV has virtually no oxidizing ability, the resulting hydroxyl radicals created from UV and ozone are tremendous oxidizers. As is the case with disinfection, the literature is replete with studies that reflect the superior oxidation performance of hydroxyl radicals formed from UV and ozone. The implications of these findings are significant for swimming pool and spa applications, because urea and chloramines limit chlorine's effectiveness and affect bather comfort. Furthermore, chloramines can volatilize, creating an unpleasant "fishy" or "chlorine" odor, and wreak havoc on indoor materials due to their corrosive nature.

As one prior art commentator indicated, the net benefits of the UV/ozone combination are attributed to the formation of hydroxyl radicals, resulting in the "power of three" for increased disinfection and oxidation efficacy. See, http://www.wqpmag.com/power-three.

UV & Ozone Technology Integration: As suggested by the prior art commentator above, it is certainly possible to install a separate ozone system before or after a UV system to achieve a dual disinfection strategy. To do so, however, requires two separate systems and installations, which can be expensive. Fortunately, some low-pressure UV lamps can emit two wavelengths: 185-nm UV light for the generation of ozone and 254-nm UV light for inactivating microorganisms. These dual-wavelength lamps are available from most UV suppliers, cost about the same as single-wavelength UV lamps and can be engineered into a single system to deliver simultaneous UV and ozone water treatment. Creating a UV/ozone combination system requires a fundamental understanding of how a conventional low-pressure UV system is configured. In such systems, UV lamps are housed in a vessel so that water passing through is exposed to the UV rays. To do this, each lamp (and there may be more than one) is surrounded with a quartz glass sleeve. This sleeve performs two key functions, it provides a physical barrier between the lamp and the water, and it allows the lamp's UV rays to be readily transmitted into the water phase. If the UV lamps used in the vessel are single-wavelength lamps, also known as germicidal lamps (i.e., lamps that emit only in the range of 254-nm UV light), then the system is a conventional UV system.

To convert a conventional system into a combination UV/ozone system requires two key steps: replacing the UV lamp with a dual-wavelength model, and providing a means to remove the ozone created inside the quartz sleeve area and inject it into the water phase. There are a variety of methods to extract ozone from the sleeve area. One way is to use a venturi. Another way is to use an air pump powered system similar to that depicted below in FIG. 3G accompanying this application. Referring to the use of a venturi or an air pump, the general process is the same: as water passes through the plumbing (whether a venturi which draws the ozone and mixes it with the water or an air pump and diffuser passing the ozone-producing UV lamps), the downstream water is ozonated and that ozonated water is then directed to enter the vessel again and is struck with the 254-nm UV light. It is the 254-nm UV light, not the 185-nm UV radiation, that is transmitted through the glass sleeve surrounding a lamp. The 254-nm UV light converts the ozone into hydroxyl radicals, creating the one-two-three punch described above. While the quantity and concentration of ozone generated are small, it is known that this can be significant in contributing to the effects of both disinfection and oxidation. The injection of ozone can be done before or after the UV light, but ozone must be injected before the UV vessel to take advantage of hydroxyl radical formation. When performed this way, no residual leaves the vessel, as the half-life of hydroxyl radicals is a fraction of a second. As a result, no ozone degassing or destruction chamber is needed, as is the case when corona discharge ozone systems are used.

A combination ozone/UV germicidal lamp unit connected to and operated with a water pump pool recirculating system is available through a company called Del Ozone. According to Del Ozone, by combining ozone and germicidal UV in a single unit, the "UV light interacts with the ozone, and the resulting chemical reaction generates hydroxyl free radicals. Hydroxyl free radicals have even more oxidation potential than ozone, the power of the whole system is increased; creating the synergy of Advanced Oxidation Process (AOP)". See: http://www.delozone.com/files/4-1958-01_Rev_C.pdf.

SUMMARY OF THE INVENTION

The present invention solves the limitations of earlier fluid treatment systems by allowing the fluid treatment system to operate 24 hours a day simultaneously with a conventional pressure fluid system when both systems (the fluid treatment system and the pressure fluid system) share the same existing outlets, inlets, and conduits from the main reservoir. The present fluid treatment system uses an auxiliary reservoir and ozonated air bubbles in a lift tube to treat fluid with ozone. In one embodiment, the ozonated fluid, or a portion of the fluid, is also treated with radiation from a germicidal UV lamp. The treated fluid is then returned to a main fluid reservoir. The main fluid reservoir may be a pool, spa, water tank, or some other fluid storage container. After ozonation of the fluid, any excess ozone gas emanating from the fluid may be captured and either destroyed or channeled to another spot prior to the return of the fluid to the main fluid reservoir.

The key to this invention is the ability for both the fluid treatment system and the pressure system to share existing outlets, inlets, and conduits, and to operate independently and simultaneously with one another, under circumstances in which it is not practical or feasible to modify existing outlets, inlets, and conduits for a variety of reasons.

Another key aspect of this invention is that, for the first time, even though the fluid treatment system is sharing inlets, outlets and conduits with a conventional fluid pressure system (even while the conventional fluid pressure system is operated in vacuum mode), it is possible to operate the fluid treatment system in such a manner as to use ozone, with the assistance of AOP technology (a combination ozone and UV radiation) as a primary disinfectant and the only disinfectant, even though both systems are operating simultaneously on existing conduits, or in situations in which the conventional pressure system is not operating at all. Previously, even in the CDC's Model Aquatic Health Code, using ozone as a primary disinfectant using shared inlets, outlets, and conduits with the fluid pressure pump system, was not feasible while it was in operation. This invention provides a solution to this issue and allows for a residual disinfectant in the water at all times without having to install new outlets, inlets, and conduits.

Previous fluid treatment systems limited the combination of using ozone or ozone in combination with UV radiation of water with a germicidal lamp for primary disinfection for recreational waters under various circumstances. For example, ozone could not be used for primary disinfection while a main fluid pressure pump system (hereinafter simply "pressure system") was in operation for circulation, filtration, and disinfection (using, for example, an ozone generator with a venturi). Furthermore, while ozone could be used for primary disinfection with the certain new technology describing various embodiments of a novel fluid treatment apparatus (disclosed in recent US patent applications by this same inventor), such new technology was not available for 24 hour primary disinfection if such a fluid treatment system had to share the main reservoir inlets, outlets, and conduits (to and from the main reservoir) with the pressure pump system. If the pressure pump and fluid treatment apparatus used separate inlets, outlets, and conduits, both systems could operate independently and/or simultaneously. But, if both systems shared the same inlets, outlets, and conduits, one system would have to be on stand-by and not operate when the other system was in operation. Both systems could not operate at the same time using the same existing conduits. This invention provides a solution and allows for either system to operate 24 hours a day even though they use the same inlets, outlets, and conduits, and both are in operation at the same time. This invention allows the use of ozone by itself as a primary disinfectant or the use of ozone with the assistance of the combination of UV germicidal radiation to create advanced oxidation products (AOPs).

Regarding simultaneous operation, previous embodiments known to this inventor did not allow for such simultaneous operation of the apparatus and pressure system using existing shared inlets, outlets, conduits or lines. If the apparatus was in operation and the pressure system was turned on, check valves were used to prevent the pressure system from interfering with the function of the apparatus (by taking fluid from the auxiliary fluid reservoir). Such check valves effectively put the apparatus on stand-by and stopped all circulatory fluid flow by the apparatus while the pressure system was in operation. Nor did prior embodiments solve issues presented by existing conduits which were too small for efficient operation of the apparatus, issues presented by having the apparatus located too far away from the main fluid reservoir, issues presented by the use of overflow tanks (such as skimmer tanks, surge tanks, or tanks used with "infinity pools"), or issues related to proper circulation of the fluid in the main fluid reservoir. The present invention solves all of the above-mentioned issues.

In one embodiment, fluid flows through existing conduits by the force of a conventional high pressure water pump to the fluid, treatment apparatus according to the present invention in such a manner as to allow both the high pressure water pump and the fluid treatment apparatus to operate at the same time using the same outlets, inlets, and conduits as used by the high pressure water pump.

In one embodiment, ozonated air bubbles in a lift tube lift fluid obtained from the main reservoir through preexisting conduits into the auxiliary reservoir positioned to the side of the main reservoir. The flow of fluid in the lift tube increases the height of the fluid level in the auxiliary reservoir above the fluid level of the main reservoir and this difference in fluid level creates a gravity flow of fluid from the auxiliary reservoir back to the main reservoir (or the flow of fluid is sent back to the main reservoir by action of an auxiliary pressure fluid pump—as depicted below), via the other preexisting conduit, and allows for the fluid to be filtered by means of a filter positioned outside of the main reservoir and in the path of fluid flow. This enables the filter to trap impurities in the fluid while the ozonated air adds ozone to the fluid in the lift tube by bubble contact. After fluid treatment, the excess ozonated air that bubbles off the surface of the fluid in the auxiliary reservoir may be captured and either destroyed or channeled to another location.

In one embodiment, the fluid filter is installed in the auxiliary reservoir. In this embodiment, the auxiliary fluid reservoir functions to both filter and ozone treat the fluid before sending the treated fluid to the main fluid reservoir. When new fluid is added to the auxiliary reservoir, this gives the filter and ozone treated water an initial opportunity to remove impurities before the new fluid flows into the main reservoir.

Broadly stated, an apparatus for ozone-aerating and filtering fluid according to the present invention for connection to a fluid treatment system for filtering thud in a main fluid reservoir, said fluid treatment system comprising a high pressure fluid pump, a high pressure filter, an input conduit for coupling fluid from said main fluid reservoir to said high pressure fluid pump, a pump output conduit for coupling fluid from said high pressure fluid pump to said high pressure filter, and an output conduit for coupling fluid from said high pressure filter back to said main fluid reservoir, comprises: an auxiliary fluid reservoir positioned adjacent to and outside of the main fluid reservoir; a lift tube positioned outside of the main fluid reservoir and having an upper end and a lower end, said lift tube upper end open within the auxiliary fluid reservoir, said lift tube extending below the auxiliary fluid reservoir a predetermined length; a first valve inserted in said output conduit for controlling the fluid flow in said output conduit; a first conduit connected between said auxiliary fluid reservoir and said output conduit on the downstream side of said first valve for enabling fluid in the auxiliary fluid reservoir to flow into the downstream side of said output conduit; a second conduit connected at one end to said output conduit on the upstream side of said first valve and connected at its other end to the lower end of said lift tube; a second valve inserted in said second conduit for metering the flow of fluid in said second conduit for enabling fluid to flow by gravity from the upstream side of said high pressure filter output conduit into the lower end of said lift tube; means for injecting ozonated air bubbles into the fluid at the lower end of said lift tube, to cause the ozonated air bubbles to ozone-aerate the fluid in said lift tube and to cause the fluid in said lift tube to flow up said lift tube and into the auxiliary fluid reservoir due to the expansion of the ozonated air as it bubbles up said lift tube, said auxiliary fluid reservoir positioned such that the level of fluid in the auxiliary fluid reservoir is thereby caused to rise higher than the level of fluid in the main fluid reservoir, such that ozone-aerated fluid in the auxiliary fluid reservoir is caused to flow by gravity into said first conduit, into the downstream side of said output conduit, and back into the main fluid reservoir; and a low pressure fluid filter positioned in the fluid path formed by said first and second conduits, said lift tube, and said auxiliary fluid reservoir, for filtering the fluid flowing therein.

Broadly stated, a method for ozone-aerating and filtering fluid according to the present invention for connection to a fluid treatment system for filtering fluid in a main fluid reservoir, said fluid treatment system comprising a high pressure fluid pump, a high pressure filter, an input conduit for coupling fluid from said main fluid reservoir to said high pressure fluid pump, a pump output conduit for coupling fluid from said high pressure fluid pump to said high pressure filter, and an output conduit for coupling fluid from said high pressure filter back to said main fluid reservoir, comprises: causing a controlled amount of fluid in said output conduit to be coupled to the bottom of a lift tube via a second conduit; injecting ozonated air into said lift tube at or near its bottom to cause the fluid in said lift tube to flow up said lift tube and into an auxiliary reservoir, and to cause the fluid in said lift tube to absorb some of the ozone in said ozonated air; collecting said ozonated fluid in said auxiliary reservoir; and causing said fluid in said auxiliary reservoir to flow by gravity back into the main fluid reservoir via a first conduit connected between said auxiliary reservoir and said output conduit downstream of where fluid flows from said output conduit to said lift tube.

Other embodiments are as shown in the figures.

BRIEF DESCRIPTION OF THE DRAWINGS

The accompanying drawings, which are incorporated in and constitute a part of this specification, exemplify embodiments of the present invention and, together with the description, serve to explain and illustrate principles of the invention and not to limit the claimed invention thereto. The drawings are intended to illustrate major features of the exemplary embodiments in a diagrammatic manner. The drawings are not intended to depict every feature of actual embodiments nor relative dimensions of the depicted elements, and are not drawn to scale. Note also that reference symbols or names are used in the Figures to indicate certain aspects or features shown therein, with reference symbols common to more than one Figure indicating like components, aspects or features shown therein.

The features, advantages, and benefits of the present invention will become more apparent from the following description taken in conjunction with the accompanying drawings, which are presented solely for exemplary purposes and not with the intent to limit the invention thereto, and in which:

FIG. 1B illustrates an alternate embodiment of a portion of the input side of an ozone-assisted fluid treatment apparatus 100 as shown in FIG. 1, wherein fluid flows to the auxiliary reservoir by a combination of fluid before and after passing the pressure filter.

FIG. 1C illustrates an alternate embodiment of a portion of the input side of an ozone-assisted fluid treatment apparatus 100 as shown in FIG. 1, wherein fluid flows to the auxiliary reservoir by use of an auxiliary fluid pressure pump when the main pressure pump is off or does not exist.

FIG. 1E illustrates an alternate embodiment of a portion of the input side of an ozone-assisted fluid treatment apparatus 100 as shown in FIG. 1, wherein fluid flows from the main reservoir into an "overflow" tank and from there to the fluid treatment apparatus 100.

FIG. 1F illustrates an alternate embodiment of a portion of the input and output side of an ozone-assisted fluid treatment apparatus 100 as shown in FIG. 1, wherein using shared inlets, outlets, and conduits, fluid flows from the main fluid reservoir to the fluid treatment apparatus 100 and back again by use of large-sized inlets, outlets, and conduits, which are in turn connected to smaller conduits to the pressure system and also connected to appropriately sized conduits for the fluid treatment apparatus 100.

DETAILED DESCRIPTION

Figure 1:
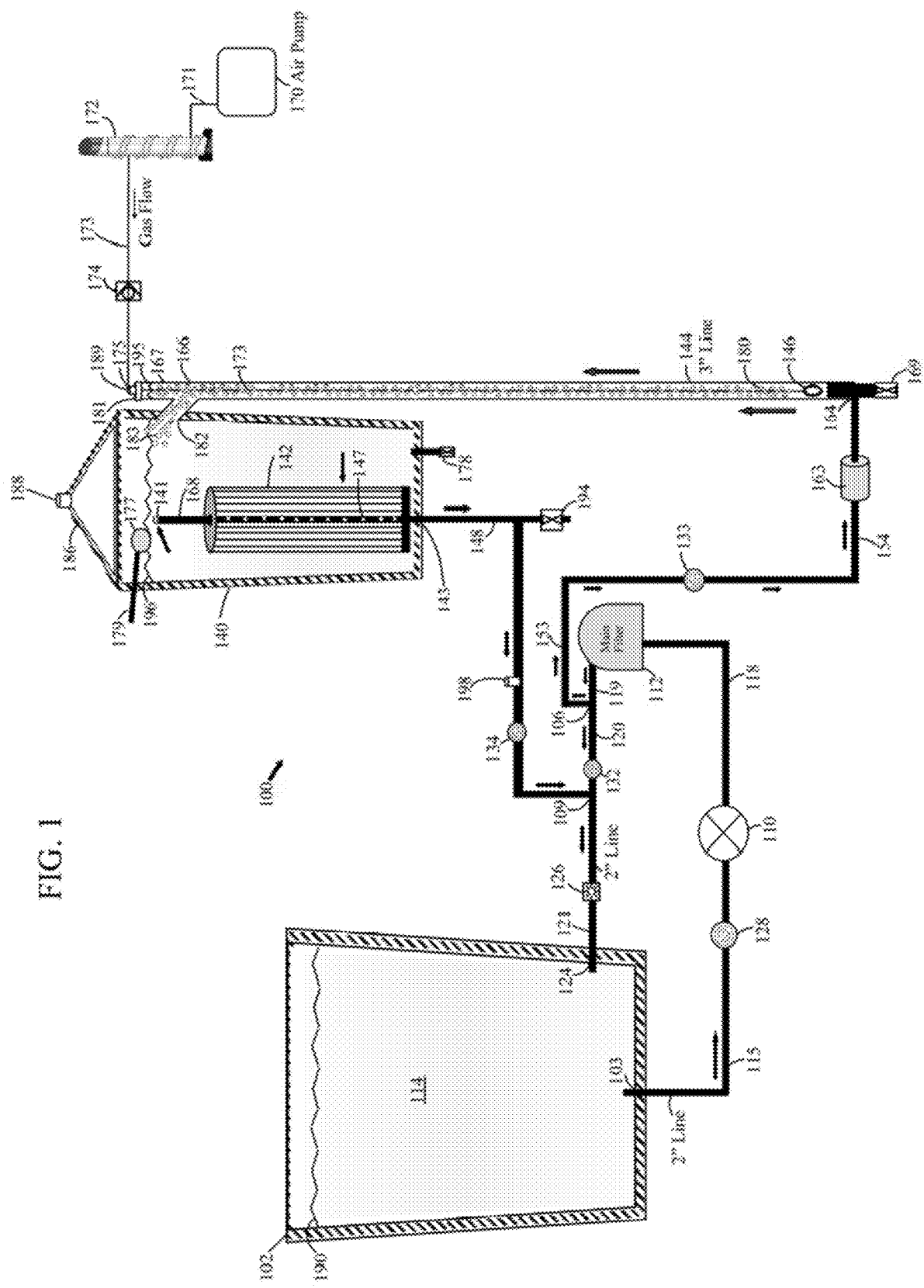
FIG. 1 illustrates an ozone-assisted fluid treatment apparatus for a fluid reservoir according to one embodiment of the present invention, wherein fluid flows from a main reservoir to an auxiliary reservoir and back to the main reservoir by means of existing conduits which are shared with a conventional fluid pressure pump and filtration system as well as some new additional conduits with the assistance of various valves, connectors, etc.

In one embodiment, the fluid treatment apparatus according to the present invention is connected to already existing conduits that connect fluid in a main reservoir to a conventional high pressure water pump and filter assembly being used to filter the fluid, to augment the filtering provided by the conventional filter assembly. This eliminates the need for separate openings to be made in the main reservoir for installation of the fluid treatment apparatus according to the invention. In one embodiment, to compensate for any fluid flow restrictions due to the diameter and length of the existing conduits, as well as restrictions caused by the diameters of existing inlets and outlets, the conventional high pressure water pump is used to overcome such restrictions and deliver just enough fluid to the fluid treatment apparatus for it to function properly as if no such restrictions interfered with its operation. In effect, it is as if the fluid treatment apparatus was positioned, virtually speaking, adjacent to the main reservoir (or the main reservoir was moved, virtually speaking, next to the fluid treatment apparatus) with conduits, inlets, and outlets appropriate for it to function properly. In one embodiment, the high pressure water pump also increases the level of the fluid above the main reservoir and the fluid treatment apparatus itself, again as if the fluid treatment apparatus was positioned, virtually speaking, adjacent to the main reservoir (or vice-versa), in order to compensate for such restrictions on the output side of the fluid treatment apparatus. An ozone generator pumps a mixture of ozone and air into a diffuser positioned at the bottom of a lift tube filled with fluid from the main reservoir, to generate bubbles in the fluid. These bubbles expand as they rise up the lift tube. These bubbles create an upward flow in the fluid contained in the lift tube. The flow of fluid in the lift tube causes the fluid to flow through a filter without the use of any conventional fluid pump, although as previously mentioned, the conventional fluid pump allows the fluid treatment apparatus to be positioned at a distance and at a height from the main reservoir to compensate for such restrictions mentioned above. The fluid flows past the filter solely due to the effect of ozonated air bubbles released inside the lift tube and not by operation of the high pressure water pump; i.e., the pressure pump does not push fluid into and up the lift tube. The upper end of the lift tube is preferably positioned to discharge the fluid in the lift tube into an auxiliary reservoir. The fluid in the auxiliary reservoir flows back into the main reservoir via the force of gravity, which force may be increased by the height of the fluid treatment apparatus just enough to overcome restrictions in the existing conduits and inlets as mentioned above. As a result, the fluid treatment apparatus according to the present invention produces a gentle, controlled flow of ozonated fluid into a pool, spa, or storage tank. Where the main reservoir is a pool or spa, one goal is to create a more desirable experience for a user of the pool or spa, as compared to a system where a conventional fluid pump is used to supply ozonated fluid. The level of ozone in the treated fluid and the flow rate of the fluid can be controlled by various system parameters, including, but not limited to, the ozone generation rate, the capacity of the air pump inside the ozone generator, the ratio of air and ozone in the mixture that is released in the lift tube fluid by the diffuser, the depth of the diffuser, the size of the diffuser and diameter of the ozonated gas lines, the dimensions of the auxiliary reservoir and the main reservoir, the dimensions of the lift tube, the specifications and size of the filter inside the auxiliary reservoir, etc.

In many parts of the world, many pools, spas, surge tanks, and storage tanks are only one meter high. Placing a diffuser stone at a depth of only one meter reduces the time allowed for ozone and oxygen to dissolve into the water, with the result that the efficiency of such a fluid treatment system is reduced.

A key aspect of each of the embodiments of the present invention described herein is that the lift tube length is not limited by the depth of the reservoir containing the fluid to be treated. The present invention enables the efficient use of ozone aeration technology by allowing the diffuser stone to be positioned preferably at about 3 meters below the surface of the water in the main fluid reservoir (virtually speaking as explained above) with a flow rate of ozonated air at about 3 to 4.5 psi, regardless of whether the pool, spa or other fluid reservoir is deep or shallow (or a storage tank is tall or short), by the use of a lift tube whose lower end is at a lower level than the bottom of the reservoir. In general, the deeper the diffuser stone is positioned in a lift tube, the more that ozone is able to dissolve into the fluid in the lift tube. In other words, the deeper the diffuser stone, the more ozone is dissolved into the fluid by the diffuser and the longer the bubbles are in contact with the fluid, thereby increasing the amount of ozone that dissolves into the fluid in the lift tube as the bubbles rise to the top. On the other hand, the deeper the diffuser stone, the greater the air pressure needs to be in order to prevent a drop off in the amount of ozonated air bubbles generated by the diffuser. Thus, for a given ozone generator having an air pump with a fixed air pressure output, a diffuser positioned deeper in the lift tube may result in a decrease in the amount of air bubbles emanating from the diffuser, with a resulting decrease in the circulation flow of water through the treatment system.

Although water is the preferred fluid to be treated according to the present invention, persons skilled in the art will appreciate that the same apparatus can be used for treating other fluids (the term "fluid" encompasses both liquid and gas and liquid/gas mixtures) without diverting from the scope of the invention. Similarly, the term "reservoir" encompasses spas, pools, storage tanks, treatment/filter tanks, etc. Additionally, the term "ozonated air" or "ozone-treated air" are synonymous, meaning a volume of air and ozone gas mixed together.

Ozone in high concentrations destroys pathogens, spores, algae and various germs and it also oxidizes a number of impurities such as iron, manganese, oils and organic wastes. According to the present invention, a high volume of treated air is pumped into the fluid 24 hours a day along with a relatively low, but reasonable, concentration of ozone. This relatively low level of ozone is in contrast to some high fluid pressure, venturi operated, high capacity ozone generators which are designed to dissolve a very high dose of ozone into the fluid in a much shorter length of time; i.e., while a conventional pressure pump is in operation. Ozone in low concentrations if a residual amount of ozone can be maintained at all times, does kill all pathogens. An ozone residual in the fluid helps to hinder the growth of many bacteria and may reduce pH fluctuations by, for example, obstructing the nitrogen cycle. The relatively gentle fluid flow past the filter also helps to keep the fluid clean too, because many impurities that would normally be pushed through a filter as a result of the force applied by a conventional fluid pump to the fluid are instead trapped by the ozone aeration and filtration apparatus according to the present invention. The advantage of using an ozone aeration system according to the present invention is that it renders the fluid in the pool, spa, or tank rather inhospitable as a growth medium; i.e., bacteria and algae that might otherwise flourish in another environment seem to be greatly reduced because of the lack of nutrients and other conditions needed for growth and reproduction. As long as a reasonable level of dissolved ozone can be maintained, the fluid treatment apparatus is designed to keep a minimum recommended detectable level of residual ozone required for disinfection (about 0.05 ppm). Another benefit of maintaining a relatively low level of ozone concentration in the ozone aeration and filtration system is allowing the filter media itself to form a bio-film composed of protozoa, bacteria, algae, and other living organisms that act as a kind of bio-filter itself with its own "ecosystem". As the water passes through the bio-film, the bio-film consumes and traps many impurities which would otherwise contaminate the pool, spa, or water tank, impurities that would otherwise create conditions fostering the growth of bacteria, algae, as well as create chemical conditions which might make the water unusable for humans. For example, such impurities could otherwise create variations in the nitrogen cycle (making ammonia) and volatile fluctuations in the acid/base pH of the water. A very high level of ozone and the use of chemicals such as chlorine, bromine, or salt (which is used to make chlorine), as used in conventional water treatment systems, may hinder the formation of such a biofilm on the filter media, or destroy such the biofilm if it has already formed.

The concept of using a biofilm for water treatment is not new. However, the inventor is not aware of its use for pools and spas. Normally, the idea comes from its use with slow sand filters which form a gelatinous layer called a Schmutzdecke (a grime or filth cover in German coined by the scientist who discovered its significance for water treatment) in the top few millimeters of the sand layer. The Schmutzdecke consists of bacteria, fungi, protozoa, worms, and a range of aquatic life. The Schmutzdecke is the layer that provides the effective treatment in potable water treatment using the sand as the underlying support medium for this biological treatment layer. As water passes through the Schmutzdecke, particles of foreign matter are trapped in the layer and dissolved organic material is adsorbed and metabolized by the bacteria, fungi and protozoa. In the present invention, the filter media, such as a Reemay media, provides the support for the Schmutzdecke as it adsorbs and metabolizes the dissolved and suspended organic materials in the main fluid reservoir. The formation of a Schmutzdecke on the fluid filter is only made possible by the combination of the gentle 24 hour filtration and ozone/aeration provided by the apparatus according to the present invention, with the low concentration of ozone and treated purified air keeping a pool, spa, or water tank exceptionally clean. So clean, in fact, that the need to use chemicals is eliminated.

It should be noted that the ozone fluid treatment embodiments disclosed in the present application are configured to work in tandem with traditional high pressure fluid pump and high pressure filter systems that are commonly employed in conjunction with pools, spas, and other fluid reservoirs. Although these traditional pumps and filters are separate from the ozone system, according to embodiments of the invention, the same conduits used for feeding fluid to and from the reservoir and the fluid pump and high pressure filter are used by the apparatus of the invention. The reason to add the ozone fluid treatment to a pool, spa, or water storage tank is that it eliminates the need for chlorine, chemicals, salts, clarifiers, pH stabilizers, or other additives that are normally needed to keep a pool, spa, or other reservoir clean.

A related patent application Ser. No. 12/634,652, by the same inventor, titled, "Ozone Generator Apparatus and Method for Purification of Air or Liquids," filed Dec. 9, 2009, discloses a unique ozone generator which provides significant improvements to existing pool, spa, and fluid storage tank ozone fluid treatment systems. Even though it has been abandoned, that patent application is incorporated herein in its entirety by reference.

For smaller pools, spas, and water storage tanks of less than 2000 gallons, the ozone generator described in application Ser. No. 12/634,652, preferably is the "double UV and double air pump system" which operates continuously 24 hours a day and produces about 6-10 grams of ozone in the same time period. It also produces about 10,000 liters of ozonated air per 24 hours. Ozone is produced by pumping filtered and heated ambient air past one or more special ozone producing UV lamps housed in a sealed chamber. The treated air is pumped through the ozone lamp housing at the rate of about 7 liters per minute at an average pressure of about 3 psi. Ozone makes up less that 1% of the total output (most UV ozone generators produce ozone on the order of 0.1 to 0.01% by weight of air fed to the generator)—the other 99% of the gas stream is air that has preferably been pre-treated, i.e., air that has been filtered and heated in order to be relatively free of pathogens, germs, algae spores, dust, and other impurities. Preferably, this mixture of air and ozone gas is piped to a diffuser positioned inside a lift tube filled with water. The diffuser releases thousands of tiny bubbles which cause the water to rise and cause a flow of water through a filter. For smaller pools and water storage tanks containing approximately 2,000 gallons, the fluid treatment apparatus of the present invention should work efficiently in conjunction with an ozone generator having the above described ozonated air output. For a pool or spa with more than 2,000 gallons, for example, an ozone generator(s) with a higher capacity (and air pumps if such ozone generator does not have an internal air pump) would be needed, and possibly a second diffuser positioned in the lift tube as well. For a spa kept at a much higher temperature than a pool, one ozone generator may be appropriate for every 5,000 liters of fluid in the spa.

As ozone can be made from many different devices (such as a corona discharge ("CD") system), any gas that comprises ozone and clean treated air having a similar ratio to the ratio described above, can be used in an ozone water treatment system according to the present invention. One consideration in determining the ratio of ozone to ambient air is the comfort of the users, as too high an ozone concentration would be irritating to the eyes and skin, and might inhibit the benefits of maintaining a biofilm filter on the system's fluid filter. On the other hand, users who did not observe proper hygiene, or who used lavish amounts of sun tan oils, or a pool or spa that is quite large or not covered, might require the use of an ozone generator with a higher output than the preferred apparatus mentioned here, or the use of multiple ozone generators, air pumps, auxiliary reservoirs, diffusers, and lift tubes, etc. To make room for more bubbles, to treat fluid in larger capacity reservoirs, the lift tube diameter can also be increased.

Referring now to FIG. 1, shown in this figure is an ozone-assisted fluid treatment apparatus 100 for a main fluid reservoir 102 according to one embodiment of the present invention. As seen in FIG. 1, a conventional high pressure water pump 110 and high pressure filter 112 filters the fluid 114 in main fluid reservoir 102 when the water pump 110 is on. Filter 112 can be a conventional sand filter or the like. Fluid is fed to water pump 110 via a first conduit 115 whose first end is connected to main reservoir 102 at drain opening 103. Fluid from the water pump is fed to high pressure filter 112 by another conduit 118. The filtered fluid output from filter 112 is fed back to the main fluid reservoir 102 at opening 124 via conduits 119, 120, and 121. The direction of fluid flow in these conduits are indicated by arrows next to these conduits. A conventional water heater 126 may be included in the path between the high pressure filter 112 and the main reservoir to enable heating of the fluid in main fluid reservoir 102. A conventional on-off valve 128 may be included in first conduit 115 to isolate water pump 110 from main fluid reservoir 102 to enable maintenance of the water pump 110 or the like.

The components of the fluid treatment apparatus 100 according to one embodiment of the present invention includes an auxiliary fluid reservoir 140, a lift tube 144, and additional conduits (in the direction of flow) 153, 154, and 148, and a low pressure fluid filter 142.

As seen in FIG. 1, conduit 153 is connected in a conventional fashion at a junction 106 to conduit 119 to enable fluid from a pool, spa, or other main fluid reservoir 102 to flow into conduit 154. On-off valve 132 on conduit 120 is closed. Conduit 153 has an on-off fluid flow control valve 133 and conduit 154 has a fluid flow metering device 163, which by manipulating on-off valve 133, can monitor the amount of fluid and flow rate to the lift tube 144.

Low pressure fluid filter 142 may be positioned anywhere in the fluid path defined by the conduits 148 and 154 and auxiliary fluid reservoir 140 in order to filter the fluid flowing in this path. Filter 142 preferably includes a filter media comprising folds of continuous filament spun-bonded polyester called Reemay® because of its high efficiency and large surface area. However, other conventional filter media may be used, such as polypropylene fibers, and sand, or diatomaceous earth filters may be used, in the embodiment shown in FIG. 1, fluid filter 142 is located in auxiliary fluid reservoir 140. Filter 142 could also be in a separate filter tank (not shown) connected along either conduit 148 or conduit 150. Such a separate filter tank may include a removable access lid and a drain valve for enabling filter 142 to be periodically drained and cleaned.

Conduit 154 goes down preferably at least several meters before connecting to the lower end of lift tube 144. In one embodiment, this connection is a 3-way connector 164 whose other end is connected to a drain valve 169. The fluid in conduit 154 flows into lift tube 144 from connector 164. In lift tube 144, the fluid comes in contact with bubbles of ozone gas and air (so-called ozonated air) produced by diffuser 146. Diffuser 146 is preferably a conventional diffuser stone. The ozonated air is produced by an ozone generator 172 and an air pump 170 which together pump pressurized ozonated air into an ozonated air gas line 173, which connects to diffuser 146. Ozone generator 172 can be a corona discharge CD, ultraviolet UV, or other form of ozone generator known in the art. A gas line check valve 174 may be included in gas line 173 to prevent fluid from lift tube 144 going back up gas line 173 and into ozone generator 172 and damaging it.

Diffuser 146 and the out-flow end of ozonated air gas line 173 can be positioned in lift tube 144 by either being lowered down into the lift tube through an opening 189 in cap 181 at 175, as illustrated in FIG. 1, or positioned in the lift tube through a Y connector (not shown) at the bottom of the lift tube. Normally a Y connector would not be practical because the lift tube in many cases will be buried at least several feet into the ground. In such a case, it would be more convenient to lower the diffuser 146 directly down into the lift tube from its top. However, in some situations, for example if the main fluid reservoir comprises a plurality of storage tanks located on the top of a building, and the lift tube is attached to the side of the building, it may be very convenient to connect the ozone line through a Y connector at the bottom of the lift tube. In addition, one has to periodically clean the diffuser stone, and to do so, it needs to be removed from the lift tube 144 and soaked in Muriatic acid (or other suitable cleaning agents), in the case where there is the need to dissolve iron or manganese that may clog the diffuser stone over time. This is another reason for inserting and removing the diffuser via the top of the lift tube 144 in most configurations, rather than through a Y connector. Drain valve 169 enables the fluid in lift tube 144 to be drained out.

The diffuser 146 releases the ozonated air into the fluid in lift tube 144 in the form of thousands of small bubbles 180 of ozonated air. Lift tube 144 preferable has a diameter of 1.5 to 6 inches (depending upon the size and treatment requirements of the main reservoir 102) and a length of about 3.5 meters. Lift tube 144 preferably is oriented straight up to prevent the ozonated air bubbles in lift tube 144 from coalescing. The rising ozonated air bubbles 180 pull the fluid upwards inside the lift tube 144. In general, the longer the lift tube the better, as it provides more fluid pressure and mixing of the ozonated air with the fluid and more contact time between the fluid and the ozonated air bubbles, to enable more ozone to both dissolve in the fluid and to produce more lift of the fluid and a higher fluid flow rate. As noted above, a limiting factor on the length of the lift tube is the ability of the diffuser to emit bubbles, since the fluid pressure exerted on the diffuser increases as the lift tube's length is increased and the diffuser is positioned deeper in the lift tube.

By use of a 3-way connector 166 with a 45 degree upward slope and an additional small extension conduit 167 connected to the top of lift tube 144, the lift tube 144 is open to within auxiliary fluid reservoir 140. The fluid level 195 at the top of the lift tube 144 and conduit 167 is the same as the fluid level 196 in the auxiliary reservoir 140. The lift tube 144 lifts the fluid into auxiliary fluid reservoir 140 under the force of the rising ozonated air bubbles in lift tube 144. The auxiliary fluid reservoir 140 should not be located closer than 3 or 4 feet to the main fluid reservoir 102, to provide some distance between the main fluid reservoir, when it is a pool or spa, and the area where the excess ozonated air dissipates in the air through opening 188 in the auxiliary reservoir and/or the top of the lift tube 144 and its extension 167 at opening 189 in cap 181. Auxiliary fluid reservoir 140 may be fitted with a screen or semi-sealed top 186 to prevent insects, birds, leaves, dust, etc. from falling into the fluid in the auxiliary reservoir 140 and/or to capture the excess ozonated air emanating from the surface of the fluid in reservoir 140 for later use or conversion back to simple oxygen. An opening 188 in top 186 may be used to pipe away any excess ozonated air from reservoir 140 via another airline (not shown). The cap 181 and opening 189 on the top of the lift tube 144 and its extension 167 may also be used for the same purpose.

The auxiliary reservoir 140 should be preferably sized to hold about 30 to 80 gallons (depending upon the size and treatment needs of the main reservoir 102) and be at a level so that the upper rim of the auxiliary reservoir is preferably about 12 to 60 inches above, virtually speaking as explained above, the fluid level of the main fluid reservoir 102. The bottom of auxiliary reservoir 140 is preferably at least about 20 inches below (virtually speaking) the surface of the fluid in the main fluid reservoir. Where the fluid filter 142 is positioned within auxiliary fluid reservoir 140, reservoir 140 needs to be of sufficient size to enable filter 142 to be fully submerged in the fluid contained in auxiliary reservoir 140 during normal operation of the water treatment apparatus 100 according to the present invention. Several filters may be used, one on top of each other, or simply one with a large diameter. When the main fluid reservoir 102 is empty, preferably all of the fluid in the auxiliary reservoir 140 should be able to drain back into the main fluid reservoir 102.

The upper 45 degree portion of connector 166 of lift tube 144 should be positioned at a point 182 and level as to be no higher than the fluid level 190 of the main fluid reservoir 102. A higher entry point might still be functional in certain situations, but the flow rate of the fluid in the lift tube 144 would decrease until at some point as the connector 166 and opening 182 for the fluid in the lift tube 144 is raised higher and higher above the fluid level 190 of the main fluid reservoir 102 (virtually speaking), the lift from the rising bubbles 180 would not be great enough to pull the fluid up and out of the lift tube 144 upper and through opening 182. Note that bubbles 183 that have exited 182 are in contact with the fluid in auxiliary reservoir 140, and therefore continue to cause ozone to dissolve into the fluid before the remaining bubbles finally emanate from the surface 196 of this fluid.

The fluid with dissolved ozone in auxiliary reservoir 140 flows back to the main fluid reservoir 102 through conduits (in direction of flow) 168, 148, and 121, and opening 124.

Conduit 148 is also fitted with an on-off fluid flow control valve 134, a drain valve 194, and one air release valve 198. Valve 134 and drain valve 194 function to prevent fluid from contaminating the main fluid reservoir 102 during cleaning or removal of filter 142, when filter 142 is positioned inside of auxiliary fluid reservoir 140. Air release valve 198 enables the release of any air trapped in the conduit 148.

When filter 142 is positioned in auxiliary fluid reservoir 140, the base 143 of filter 142 or optionally an internal conduit 168 with holes for the fluid to go in after passing the filter media of filter 142 is preferably directly connected to 148 in order to enable fluid filtered by filter 142 to flow directly into conduit 148 after the fluid in auxiliary reservoir 140 has been filtered. The top of conduit 168 may be fitted with an opening 141 to prevent fluid from otherwise overflowing.

An overflow sensor (not shown) may be positioned above the normal fluid level 196 in auxiliary fluid reservoir 140. A sensor would generate an alarm signal when sensor detects fluid in reservoir 140 rises above a predetermined level. This typically will occur when the filter 142 has become clogged, thereby preventing fluid from passing through filter 142 and back into the main fluid reservoir 102. Once the filter is cleaned, the fluid level 196 would again be at its normal level (virtually speaking) above the level. 190 of the fluid in main reservoir 102 once the apparatus 100 is again operating. A drain valve 178 in auxiliary fluid reservoir 140 can be opened to allow fluid in auxiliary reservoir 140 to drain out if filter 142 is being cleaned in situ in reservoir 140. Fluid control valve 134 may need to be closed during cleaning of filter 142, depending on where filter 142 is located in the fluid path of apparatus 100, in order to prevent contaminating the fluid in the main fluid reservoir 102 during this cleaning process.

Such a sensor would also be helpful if the aeration system failed to operate for some reason, because the fluid pressure pump may cause the auxiliary reservoir 140 to overflow and perhaps, even drain the fluid from the main reservoir 102.

A float valve 177 is preferably positioned in said auxiliary fluid reservoir 140 for sensing when the fluid level 196 in said auxiliary fluid reservoir 140 drops below a predetermined level. A conduit 179 connected between said auxiliary fluid reservoir 140 and an external fluid source (not shown) enables fluid to be added to said auxiliary fluid reservoir 140 in response to the sensing by float valve 177 of the low fluid level.

The fluid path for fluid in the ozone-assisted water treatment apparatus 100 shown in FIG. 1 is therefore from the main fluid reservoir through conduits 115, 118, 119, 153, and 154, respectively, up the lift tube 144 and into the auxiliary fluid reservoir 140, and from there through filter 142 and back into the main fluid reservoir via the conduits 168 (optional), 148 and 121, respectively, with fluid flow being created by the bubbles in the lift tube 144 generated by diffuser 146. If practicable, the location of the drain opening 103 and opening 124 in main fluid reservoir 102 can be adjusted (and preferably positioned as far apart as practical) so that there is maximum water flow and circulation of the entire contents of the main fluid reservoir through the operation of the fluid treatment apparatus 100. To maximize the function of the fluid treatment apparatus, one could evaluate every potential inlet, outlet, and conduit leading to and from the main reservoir for its potential to bring or return fluid to the fluid treatment apparatus, even if it meant going the "wrong way" such as using a vacuum conduit as an return conduit to return fluid back to the main reservoir from the fluid treatment apparatus 100.

Note that, where the water pump 110 and/or filter 112 are above the water level of the main fluid reservoir, i.e., if drain line conduit 115 goes up to the water pump 110, the fluid treatment apparatus 100 would (unless the fluid is being delivered at all times by the fluid pressure pump) have to be connected to conduit 115 below the water level 190 of the reservoir 102 in order for the apparatus 100 to function. As illustrated by FIG. 1 wherein the fluid pressure pump is sending the fluid to the bottom of the lift tube, there is still no need to create a new hole in the reservoir 102 in order to connect up the fluid treatment apparatus 100. However, there may be a need to excavate beneath a surrounding deck or concrete pad in order to access the conduit 115 at the most suitable spot.

The use of existing conduits, variations in diameters, and distances away from the main reservoir to gain access, as well as the size and number of the inlets and outlets, presents many challenges for the efficient operation of the fluid treatment apparatus 100. Even more challenges are presented when the conventional fluid pressure pump is in operation or as is often the case, the fluid is being filtered with a high pressure filter (such as a sand filter) or in vacuum mode. In most situations, these challenges can be overcome by use of the conventional pressure pump and various on-off valves and connections. The use of electrically actuated two and three-way valves may be very helpful and automate the system, for example, selecting one conduit versus another depending upon the circulation and filtration cycles.

As described above and as illustrated in FIG. 1, the fluid path to the fluid treatment apparatus 100 is through conduit 115, through the conventional fluid pressure pump, through 118, through the high pressure filter 112, through conduit 19, through a conventional 3-way connector 106, through conduit 153, and through conduit 154 to the lift tube.

Most likely, the size of the inlets, outlets, and conduits, as well as the length of such conduits do not allow for a suitable and convenient location for the auxiliary fluid reservoir and that such existing inlets, outlets, and conduits might restrict or inhibit the function of the ozone-assisted fluid treatment apparatus 100, or worse, prevent its operation at all. One solution, as illustrated by FIG. 1 is to use the main circulation pressure pump 110 and send fluid to the lift tube in such a quantity and at a given flow rate as to match the capacity, requirements, and function of the ozone-assisted fluid treatment apparatus 100. One must consider and calculate the expected circulation, filtration, and disinfection requirements of the main fluid reservoir, in terms of its size, bather loads, environmental conditions, weather, etc. Such a calculation of how to keep the main reservoir clean and clear takes many factors into account. Also, the larger the main reservoir, the more challenging. Such factors to consider would include, but are not be limited to, the size, number, and height of auxiliary reservoir and the water level it can hold in relation to the main reservoir and the capacity of the fluid pressure pump supplying the fluid, the size, number, and filtering characteristics of the low pressure filters inside the auxiliary reservoir, the capacity of the ozone generators and whether they be of UV or corona discharge (CD) design, capacity of various air pumps, size of venturi if such technology is employed, size of the air and gas lines, size and number of diffuser stones, size and depth of the lift tube, and the size and number and location of additional treatment devices (such as a UV germicidal lamp as illustrated in FIG. 1G, below), etc.

At all times as illustrated in FIG. 1 (except FIGS. 1D and 1H discussed below), fluid flowing from the fluid pressure pump 110 to the fluid treatment apparatus 100 is under pressure and in a "closed circuit" from the pressure pump to the lift tube. With the use of a flow meter 163, it would be possible to know the amount of fluid and adjust the flow rate and volume of fluid being sent to the lift tube. It is important, however, to match the factors mentioned above relating to the treatment requirements with the flow and pressure of fluid sent by the pressure pump. For the ozone-assisted fluid treatment apparatus 100 to function correctly, the fluid must not be pumped or "pushed" into the lift tube, but rather fluid must be drawn into the lift tube by action of the ozonated bubbles and other factors previously mentioned. However, one can take advantage of the fluid pressure pump by elevating the fluid treatment apparatus 100, in effect, creating a higher water level in the auxiliary reservoir 140 than the afore-mentioned factors (air pump, size of lift tube, etc.) might be able to achieve without a pressure pump and use that extra height and additional force of gravity to help the fluid flow back to the main reservoir and compensating for the restrictions of the existing conduits and openings in the main reservoir which would more likely than not would inhibit the normal operation of the fluid treatment apparatus 100 by restricting the flow of fluid back to the main reservoir from the auxiliary reservoir.

As one can note, using existing conduits which are shared by both the ozone-assisted fluid treatment apparatus 100 and the main pressure circulation and filtration system has its pros and cons. While in some circumstances a large capacity air pump such as 170 might be able to draw fluid to the lift tube 144 with enough power to compensate for otherwise restrictive conduits and openings in the main reservoir, generally speaking, one will need to have a pressure fluid pump on at all times.

Figure 1A:
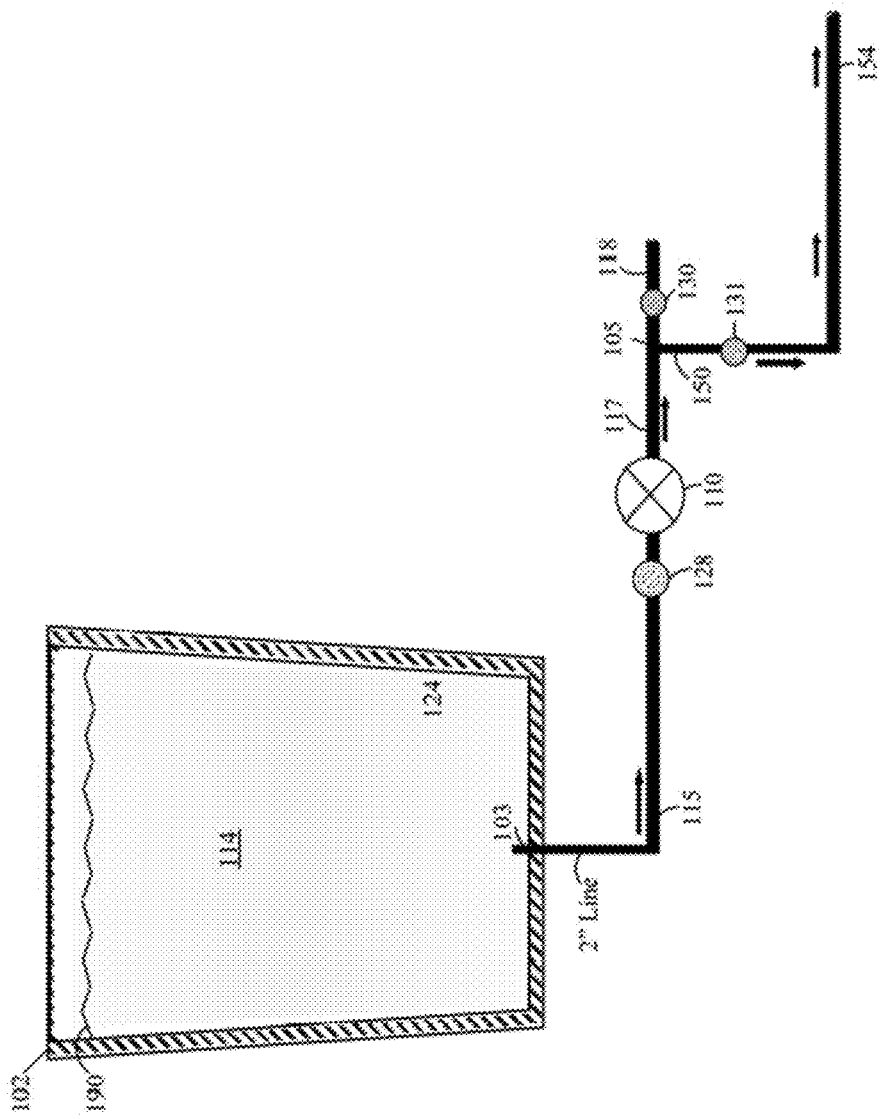
FIG. 1A illustrates an alternate embodiment of a portion of the input side of an ozone-assisted fluid treatment apparatus 100 as shown in FIG. 1, wherein fluid flows to the auxiliary reservoir directly from the main fluid pressure pump.

FIG. 1A illustrates an alternate embodiment of a portion of the input side of an ozone-assisted fluid treatment apparatus 100 as shown in FIG. 1, wherein fluid flows through in a similar manner as described in FIG. 1 above, but in this case, the fluid flows to the auxiliary reservoir before passing the pressure filter 112. In this case, on-off valve 130 on conduit 118 is closed and the fluid flows from the fluid pressure pump 110, through conduit 117, through 3-way connector 105, through conduit 150 and through on-off valve 131, and through conduit 154 and from there onwards, in a similar manner as in FIG. 1.

FIG. 1B illustrates an alternate embodiment of a portion of the input side of an ozone-assisted fluid treatment apparatus 100 as shown in FIG. 1, wherein fluid flows through both paths described in FIG. 1 and FIG. 1A. The flow rate and amount of fluid can be enhanced by combining the fluid from each path, and the ratio of fluid which passes the pressure filter 112 as opposed to going directly from the pressure pump to the lift tube, can be an advantage depending upon the quality of water in the main fluid reservoir. As illustrated in FIG. 1B, for fluid to flow as described above, on-off valve 132 must be closed and on-off valves 131 and 133 must be open. It should be noted that the fluid flow rate and pressure of the fluid drop after it passes the pressure filter 112 depending upon the filter media and its condition. Therefore, it takes care and skill to modulate the fluid flow rate and pressure depending upon whether one chooses to have more or less fluid after it passes the pressure filter 112.

FIG. 1C illustrates an alternate embodiment of a portion of the input side of an ozone-assisted fluid treatment apparatus 100 as shown in FIG. 1, wherein fluid flows to the fluid treatment apparatus 100 not by operation of the main pressure fluid pump 110, but by operation of an auxiliary fluid pressure pump 111 when the main pressure pump is off or does not exist. As illustrated in FIG. 1C, fluid flows through 3-way connector 104, through conduit 152, through on-off valve 129, and through conduit 154 and thereafter in a similar fashion as in FIG. 1, above.

Figure 1D:
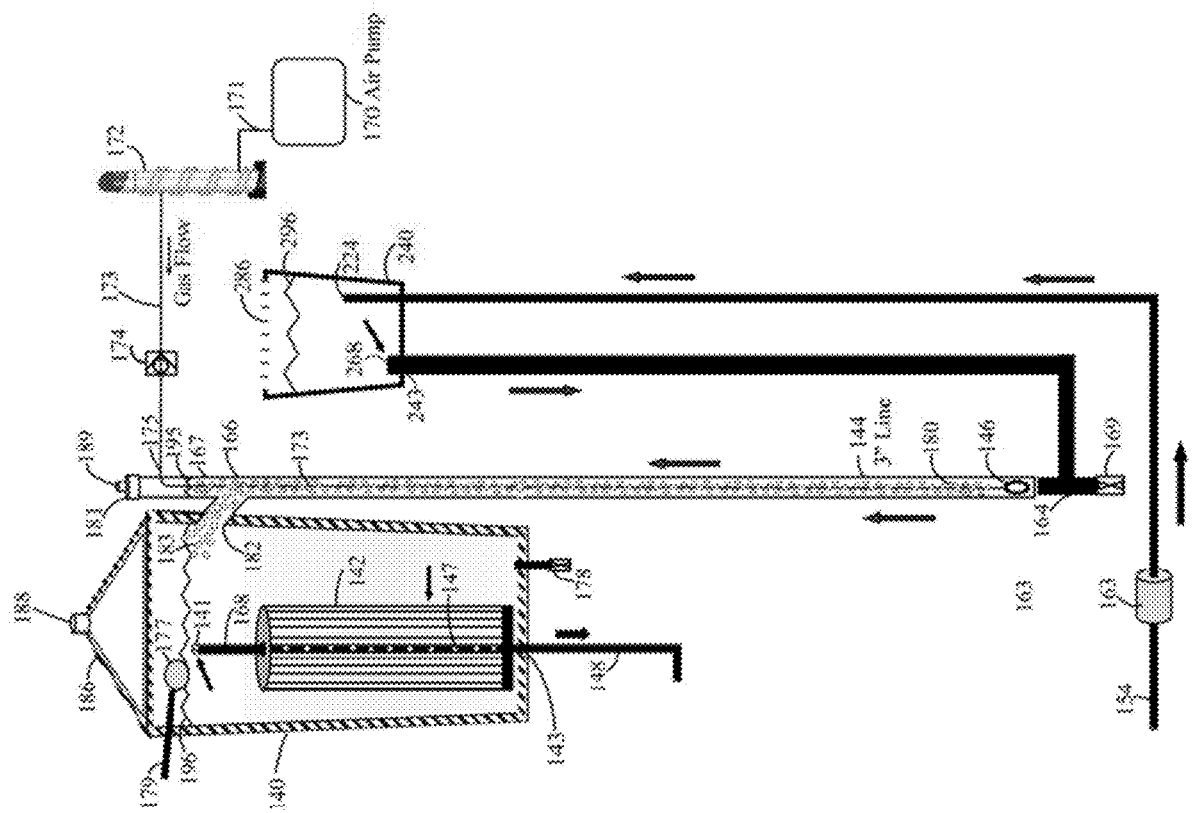
FIG. 1D illustrates an alternate embodiment of a portion of the input side of an ozone-assisted fluid treatment apparatus 100 as shown in FIG. 1, wherein fluid flows to a small "monitoring" tank before the fluid resumes its path to lift tube and to the auxiliary reservoir.
Figure 1G:
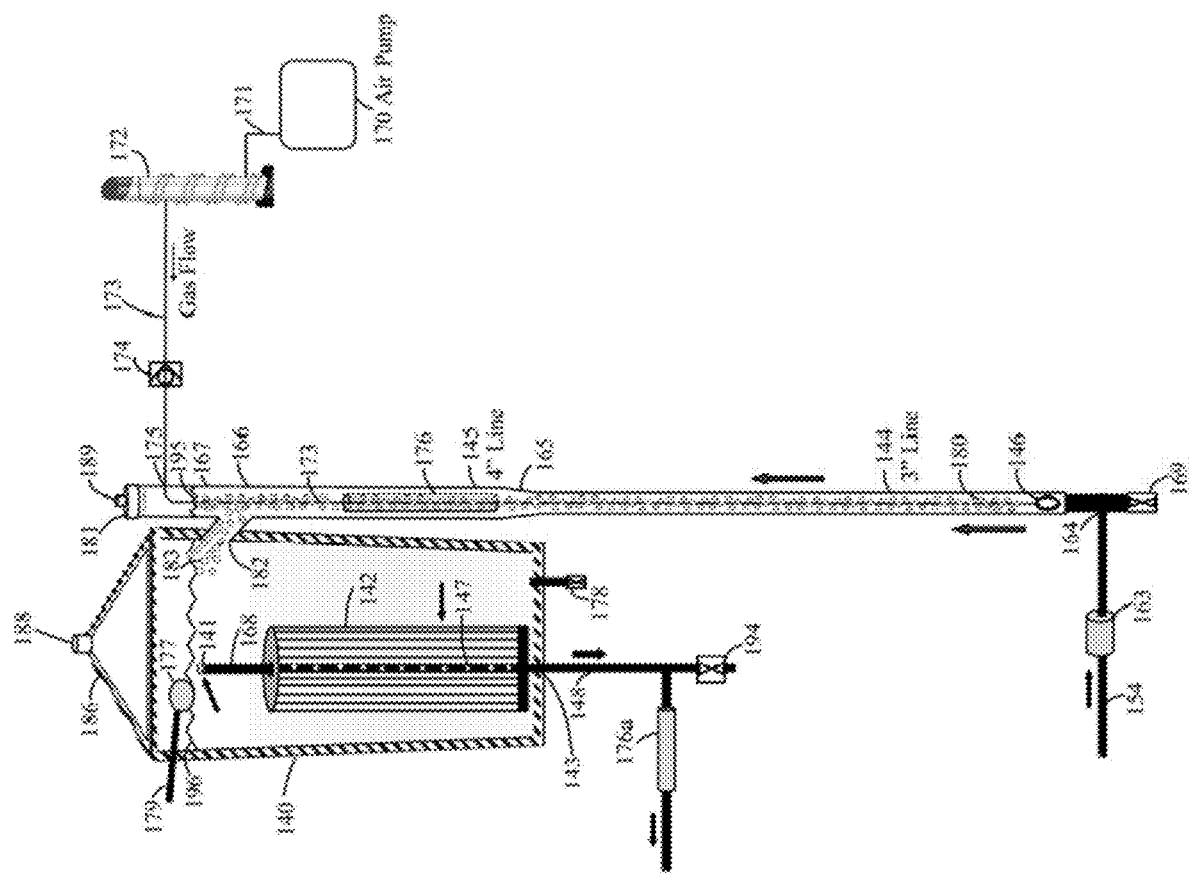
FIG. 1G illustrates an alternate embodiment of a portion of the input and output side of an ozone-assisted fluid treatment apparatus 100 as shown in FIG. 1, wherein fluid is treated by a UV germicidal lamp.

FIG. 1D illustrates an alternate embodiment of a portion of the input side of an ozone-assisted fluid treatment apparatus 100 as shown in FIG. 1, wherein fluid flows to a small "monitoring" tank 240 before the fluid is drawn into the lift tube 144 and to the auxiliary reservoir 140. Tank 240 illustrates an "open" circuit fluid path design, in contrast to the "closed" circuit fluid paths as represented by FIG. 1 and FIGS. 1A-1C, wherein the fluid flows to, but into, the lift tube 144 by operation of a fluid pressure pump. In a sense, tank 240 is just a sensor, a visual monitoring device, and way to know how much fluid at a given level is available for the fluid treatment apparatus 100 to operate properly, taking into account all of the factors and components which influence the operation of the fluid treatment apparatus 100 and how such factors and components function in relation to each other. As illustrated in FIG. 1D, the fluid path flows from conduit 154 to auxiliary tank 240 via opening 224 and then goes to lift tube 144 via conduit 255 (a 3" pipe) entering at opening 268 and descending through the auxiliary tank 240 at 243 and through 3-way connector 164. The arrows show the direction of fluid flow. By monitoring the fluid level 296 in the auxiliary tank 240, one can adjust the fluid level 296 and adjust the various on-off valves, pressure pump(s), low pressure filter(s), size of lift tubes 144 and 145, height of the auxiliary reservoir 140, capacity of the air pump(s), ozone generator(s), diffuser stone(s), etc., as described above, as required so that the fluid level 296 in auxiliary tank 240 is matched to the fluid level 196 in the auxiliary fluid reservoir 140; i.e., by action of the air pump(s) and ozonated bubbles 180, fluid is lifted into the auxiliary reservoir 140 to an appropriate level 196, normally between 10 cm to 50 cm above the fluid level 296 in the auxiliary tank 240. In many ways, tank 240 is the creation of a "virtual" main reservoir, such as main reservoir 102, moved adjacent to the auxiliary reservoir 140.

FIG. 1E illustrates an alternate embodiment of a portion of the input side of an ozone-assisted fluid treatment apparatus 100 as shown in FIG. 1, wherein fluid flows to the main reservoir by gravity into an "overflow" or surge tank 202 and from there to the auxiliary reservoir 140 via the pressure pumps, etc. Overflow tank 202, is filled with fluid 214, which drains by gravity from the main reservoir 102 via conduit 203 which is about the level 190 of the main reservoir 102. Normally, during normal circulation cycles, fluid level 190 increases and the fluid flows to overflow tank 202. The fluid path to the fluid treatment apparatus 100 is from overflow tank 202 via conduit 115 at opening 103 and so forth. Generally speaking, a fluid pressure pump would have to be used at all times.

FIG. 1F illustrates an alternate embodiment of a portion of the ozone-assisted fluid treatment apparatus 100 as shown in FIG. 1, wherein using shared inlets, outlets, and conduits, fluid flows from the main fluid reservoir 102 to the auxiliary reservoir 140 and back to the main reservoir 102 by use of large size inlets, outlets, and conduits connected by smaller lines to the pressure system 110 and appropriately sized lines to the auxiliary fluid reservoir. As the main reservoir gets larger and larger and/or the bather loads increase, newly renovated or constructed main reservoirs 102 may benefit from long tested designs and configurations of conduits, valves, connectors, etc. and attempt to share inlets, outlets, and some conduits for the pressure system and for the treatment fluid apparatus 100. As illustrated in FIG. 1F, illustrative of one embodiment of the present invention, the outlet 103 and conduit 115 are 8" in diameter, while conduit 116 supplying fluid to the main pressure pump 110 is a traditional 2" conduit. For the fluid treatment apparatus 100, fluid flows from connector 104 through conduit 152, a 4" conduit. Similarly, on the output side of the fluid treatment apparatus 100, conduit 148 depicts a 4" diameter pipe, joining an 8" pipe conduit 121 at 3-way connection 109 (which also allows fluid to return from the pressure filter and pressure pump on a conventional 2" pipe conduit 120). For convenience, circulation and filtration requirements disinfection, and economy, there would be many shared inlets, outlets, and conduits for various kinds of main reservoirs 102, including pools and spas, which might elect to use fluid flows as illustrated in FIG. 1F. The sizes of the inlets, outlets, and conduits are only illustrative, and many sizes and lengths are possible, as well as multiple inlets and outlets at various places around the main fluid reservoir. One consideration is that the fluid treatment apparatus 100 should be able to function normally and simultaneously with the main pressure pump and pressure filter without inhibiting the function or operation of either system. Another consideration is that the circulation, filtration, and disinfection of the fluid in the main fluid reservoir is complete; i.e., at all times and in all areas of the main fluid reservoir the fluid can maintain an ozone residual and that all the fluid is being treated as much as possible and there are no "dead spots" where the fluid is stagnant (and not getting any ozonated fluid). These shared inlets and conduits must be below the water level 190 of the main reservoir 102. If an overflow or surge tank is the source of fluid, a pressure pump would always be required, unless a powerful air pump was able to lift fluid to such an extent as to allow the lift tube 144 to function properly and allow the ozonated fluid in the auxiliary reservoir to return to the main reservoir.

FIG. 1G illustrates an alternate embodiment of a portion of the output side of the ozone-assisted fluid treatment apparatus 100 as shown in FIG. 1, wherein a UV germicidal lamp 176 is placed in lift tube 144 or alternatively a UV germicidal lamp 176a is positioned on conduit 148. In some applications, a very high intensity UV germicidal lamp may be desired, enough to disinfect the fluid, create AOPs, and inactivate pathogens and algae as much as possible. Fluid pressure pump 113, as illustrated in FIG. 1C above, may be necessary if the design of the UV germicidal lamp 176a is such that it hinders the flow of fluid back to the main reservoir 102. One must be aware that as the UV radiation produces AOPs which are very useful for water treatment, it does so at the expense of ozone and dissolved ozone in the fluid; i.e., the radiation converts ozone back to oxygen. This can be an issue for maintaining an ozone residual in the main reservoir sufficient to be used as a primary disinfectant.

FIG. 1G illustrates the use of a UV germicidal lamp 176 to treat the ozonated fluid in apparatus 100. In the embodiment shown in FIG. 1G, UV lamp 176 is positioned to irradiate the fluid in the lift tube 144 and 145 (connected by connector 165) of the ozone-assisted fluid treatment system 100, at a point where there are concentrated levels of ozone in the fluid. By combining ozonated fluid and a germicidal UV lamp in a single apparatus 100, the UV light interacts with the ozone, and the resulting chemical reaction generates hydroxyl free radicals (AOPs) in the fluid flowing in the lift tube. It may be that the AOPs are gone by the time the fluid enters conduit 148, or even the auxiliary reservoir 140. Hydroxyl free radicals are very fast acting (nano-seconds) and have even more oxidation potential than ozone. As a result, the purification power of fluid treatment apparatus 100 is increased. Also, as an oxidizer, AOPs reduce the oxidative load that ozone would be expected to treat. So, even though ozone might be sacrificed to make AOPs, perhaps the ozone that is left will have a higher concentration than other vise. Since UV radiation of ozonated water converts ozone to simple oxygen as it creates advanced oxidation products (AOPs), care must be taken with the operation of the UV germicidal lamp by selecting its intensity, time of operation per day, whether or not another UV germicidal lamp is also operating in another conduit, and the function it is performing so that an ozone residual can be maintained in the main reservoir if ozone is to be used as a primary disinfectant in lieu of chlorine or other chemicals.

If the ozone generator produces ozone by use of a UV lamp, the UV lamp used to create ozone and the UV germicidal lamp emit UV radiation at different frequencies and use different materials. If ozone generator 172 indeed uses a UV lamp for ozone generation, the UV ozone generator 172 uses UV radiation to create ozone out of air (or in some cases, from pure oxygen gas), but no fluid passes through, or is inside the ozone generator 172. A UV lamp in ozone generator 172 would use a quartz jacket to allow a specific light frequency, in the range of 185 nm, to pass through the lamp to the air. The UV germicidal lamp 176 located inside the upper 4" conduit 145 of lift tube 144 and/or a second UV germicidal lamp 176a located along conduit 148 (both lamps of which the placement, timing, and location on any given conduit are entirely optional according to those skilled in the arts), on the other hand, generate a different wavelength, preferably in the range of 250-270 nm that functions to cause UV disinfection of the fluid rather than for creating ozone gas. Many companies offer products using ozone and UV disinfection lamp combinations. A unique aspect of the present invention is that the ozone-assisted fluid treatment system 100 creates the flow of fluid through system 100 with only an air pump; i.e., the injection of ozonated air into the ozone-assisted fluid treatment apparatus 100 causes the fluid to be aerated, circulated out of and back into the main fluid reservoir 102, filtered, and treated with ozone and UV disinfection all at the same time. In additional embodiments (also included in this application), the flow of fluid and the ozonation of the fluid is caused by a combination of a fluid pressure pump and venturi.

In another embodiment, only one UV lamp is needed to generate both the ozonated air and the UV disinfection radiation. In this embodiment of the fluid treatment apparatus, air from the air pump is first irradiated with UV radiation at 185 nm by the UV lamp and then, afterwards, the ozonated air is injected into the fluid in the apparatus 600 by use of a diffuser 146, the fluid is irradiated by UV radiation in the range of 250-270 am from the same UV lamp. It is within the ordinary skill in the art to arrange separate conduits to enable both air and fluid to be separately irradiated by the same UV lamp and in the same unit.

There are many types of UV germicidal lamps which may be installed, with the ozone-assisted fluid treatment apparatus 100 according to the present invention. Essentially, a UV germicidal lamp is placed inside a pipe. One company called Hanovia, shows a number of different models which could be installed in-line with the out-flow of the ozone-assisted fluid treatment system. See, http://www.hanovia.com/uv-products. Other exemplary lamps suitable for pools and spas are described by a company called Delta UV. On its website, it shows lamps of various intensities, for example, the "EA Series" UV germicidal lamps. See http://deltauv.b2bmarketsites.us/wp-content/uploads/2015/04/EA_SERIES_2015_WEB.pdf.

Figure 1H:
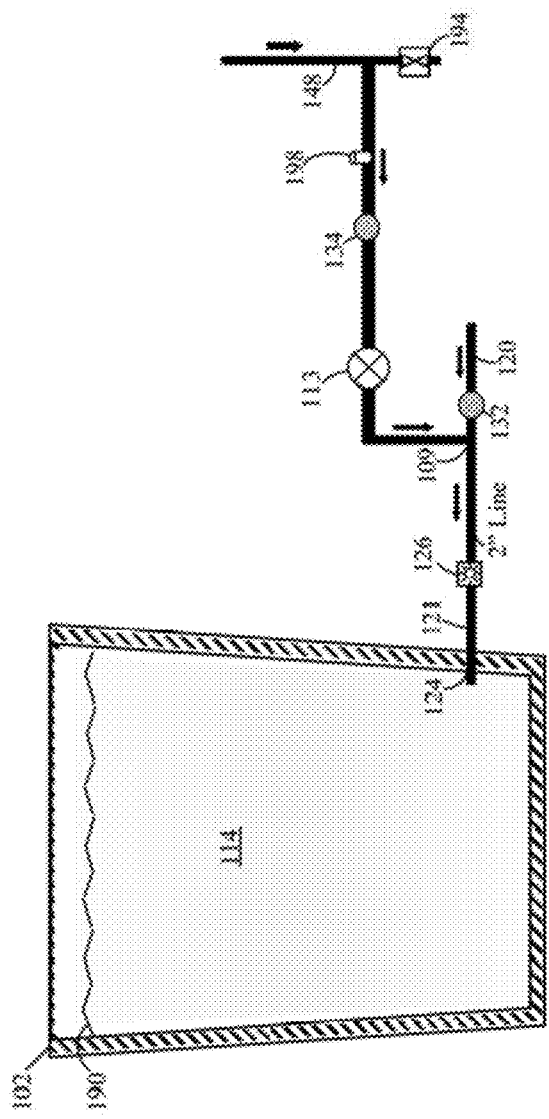
FIG. 1H illustrates an alternate embodiment of a portion of the output side of an ozone-assisted fluid treatment apparatus 100 as shown in FIG. 1, wherein fluid is assisted by an auxiliary fluid pressure pump on a conduit returning fluid back to the main reservoir.

Other exemplary types of lamps are shown on the following website which shows, for example, a 20 watt submersible UV germicidal lamp, which may be placed inside the lift tube supplying ozonated fluid for the ozone-assisted fluid treatment apparatus. It should be noted that not all UV germicidal lamps are intended for swimming pool; i.e., some are used for aquariums. Therefore, the safety standards are not the same as one would require for use with humans (as opposed to fish). However, some companies do offer submersible UV germicidal lamps for swimming pool, etc. See, http://snxin.company.weiku.com/item/uv-swimming-pool-water-treatment-uv-lights-amp-lighting-submersible-hours-water-purifier-14224172.html FIG. 1H illustrates an alternate embodiment of a portion of the output side of an ozone-assisted fluid treatment apparatus 100 as shown in FIG. 1, wherein fluid flows to the main reservoir 102 by use of an auxiliary pressure pump 113 positioned on the return conduit 148 from the auxiliary fluid reservoir 140 back to the main fluid reservoir 102. Such an auxiliary pressure pump 113 may be necessary to compensate for restrictions caused by the openings in and/or conduits back to the main reservoir 102.

Figure 2:
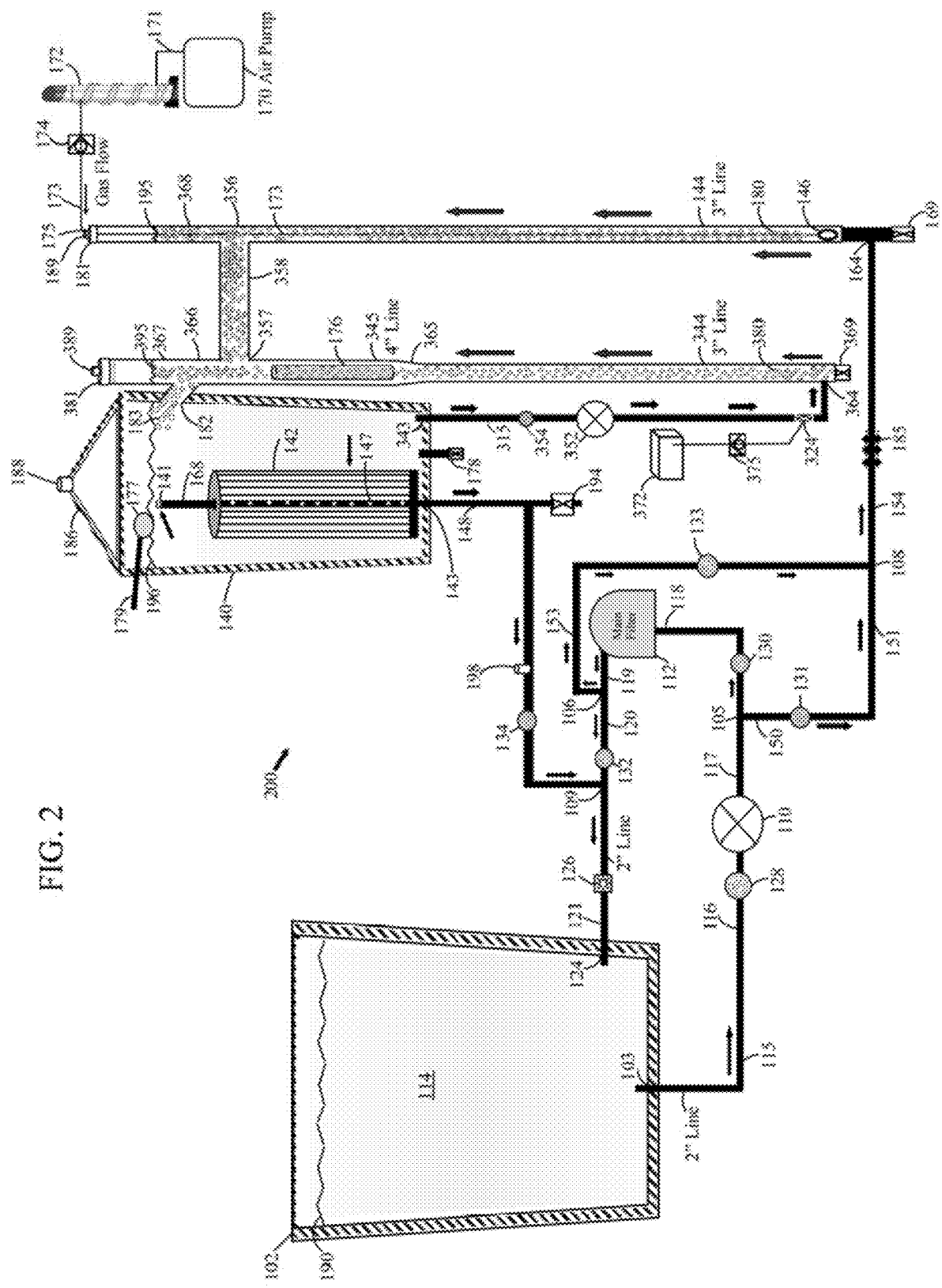
FIG. 2 illustrates an ozone-assisted fluid treatment apparatus 200 for a fluid reservoir according to another embodiment of the present invention as shown in FIG. 2, wherein an ozone generator and venturi are used to produce additional ozone together.

FIG. 2 illustrates an ozone-assisted fluid treatment apparatus 200 for a fluid reservoir according to another embodiment of the present invention as shown in FIG. 2, wherein an ozone generator and venturi are used to add additional ozone to fluid from the auxiliary reservoir 140 in a continuous loop and to function in conjunction with a single lift tubes as previously described in FIG. 1, above. As illustrated in FIG. 2, fluid flows from the main reservoir as in FIG. 1B to conduit 154 and into lift tube 144 and into the auxiliary fluid reservoir through opening 182 via some connectors and conduit as more fully explained below.

Some fluid from auxiliary reservoir 140 flows through conduit and into conduit 344 (a 3" diameter pipe) into a slightly larger conduit 345 (a 4" diameter pipe) where such fluid is radiated by a UV germicidal lamp 176 to create AOPs and disinfect the fluid. Conduits 344 and 345 are not lift tubes and do not act like lift tubes. The fluid is "pushed" through conduit 344 and 345 by the force of pressure pump 352. The conduits 344 and 345 are 3" in diameter so that the fluid, which is rushing in through conduit 315 (which is preferably about ¾" to 1.5" diameter pipe so it can be connected to a similarly-sized venturi) by action of the pressure pump 352, can slow down as it goes through the larger 3" and 4" diameter conduits.

As illustrated in FIG. 2, in order to supply the motive force for the fluid to flow through fluid treatment apparatus 200 and back to the main reservoir 102, a lift tube 144 is used to draw fluid from conduit 154 via 3-way connector 164. Magnets 185 may be installed along conduit 154 to aid in the treatment process. Magnetic water treatment may be described as using a powerful focused magnetic field on water flowing through a pipe. Fluid entering lift tube 144 is injected with ozonated bubbles in the same manner as in FIG. 1, above. Lift tube 144 is joined to conduit 345 by connectors 356 and 357 and conduit 358, so that the fluids from both conduit 345 and lift tube 144 can conveniently flow into auxiliary reservoir 140 at opening 182. As previously depicted in FIG. 1 above, FIG. 2 illustrates the use of only one lift tube 144, an air pump 170 and ozone generator 172 to supply pressurized ozonated air via line 173 which is released at the bottom of lift tube 144 by diffuser stone 146, causing bubbles 180 to lift the fluid entering in connector 164 to rise and join the fluid in conduit 345.

As depicted in FIG. 2, connector 366 is designed so that a UV germicidal lamp 176 can be lowered into the ozonated fluid in conduit 345 so that the fluid can easily flow into the auxiliary reservoir at 45 degrees. Connected to connector 366 is conduit 367 which extends upwards a reasonable length so that the fluid level 395 can be approximately the same as fluid level 196 in the auxiliary reservoir 140. This is accomplished by virtue of the fact that conduits 344 and 345 slow the fluid flow rate so that it is much less than conduit 315 which through opening 343 allows fluid to flow to pressure fluid pump 352. On on-off valve 354 is positioned along conduit 315 to control the amount of fluid flowing to pressure pump 352.

As illustrated in FIG. 2, only one lift tube 144 (a 3" diameter pipe) is installed and it is separated from conduits 344 and 345 to prevent the pressurized fluid in conduits 344 and 345 from interfering with the function and benefits of lift tube 144, which lifts fluid by action of the rising ozonated bubbles. By the same token, pressure pump 352, ozone generator 372, and venturi 324 can ozonate the fluid in a continuous loop from the auxiliary reservoir 140 and back again. As depicted in FIG. 2, there is only one inlet to auxiliary reservoir 140 as conduit 345 and lift tube 144 are joined together in this embodiment; however, it would be perfectly feasible to have separate inlets (not shown) if that is more convenient.

As illustrated in FIG. 2, the source of the fluid being treated in lift tube 344 and 345 (joined by connector 365) by ozone generator 372 and venturi 324 comes from the auxiliary reservoir 140. This affords an opportunity to saturate the fluid with ozone depending upon the treatment requirements and bather loads of the main reservoir 102. One benefit of such a design is that the fluid pressure pump 352 can be much smaller than a conventional fluid pressure pump designed to circulate and filter fluid directly from the main reservoir and back again. This may save electricity and operate more efficiently. And, it may allow for 24 hour ozonation of the fluid and production of AOPs in greater amounts.

FIG. 2 also illustrates how the undissolved ozonated air bubbles generated by the venturi can be dissipated in the auxiliary reservoir 140, obviating the need to install special equipment required by conventional pressure pump-driven CD generators and venturi ozonation systems which necessarily use various means to remove the undissolved gas from the fluid before the fluid returns to a pool or spa.

FIG. 2 and its various other embodiments FIG. 2A through FIG. 2D, discussed below, do not depict the use of a monitoring tank 240 as depicted in FIG. 1D, above, which helps to visualize and balance the various parameters as mentioned in FIG. 1 and its various different embodiments so that fluid is not "pushed" into lift tube 144. In all cases, such parameters are necessary to consider in order to balance and make sure the ozone-fluid treatment apparatus can function properly. As mentioned above, the considerations include the capacity of the air pump, ozone generator, diffuser, pressure pumps, height and location of the auxiliary reservoir, the size of the inlets, outlets, and conduits used, etc.

Figure 2A:
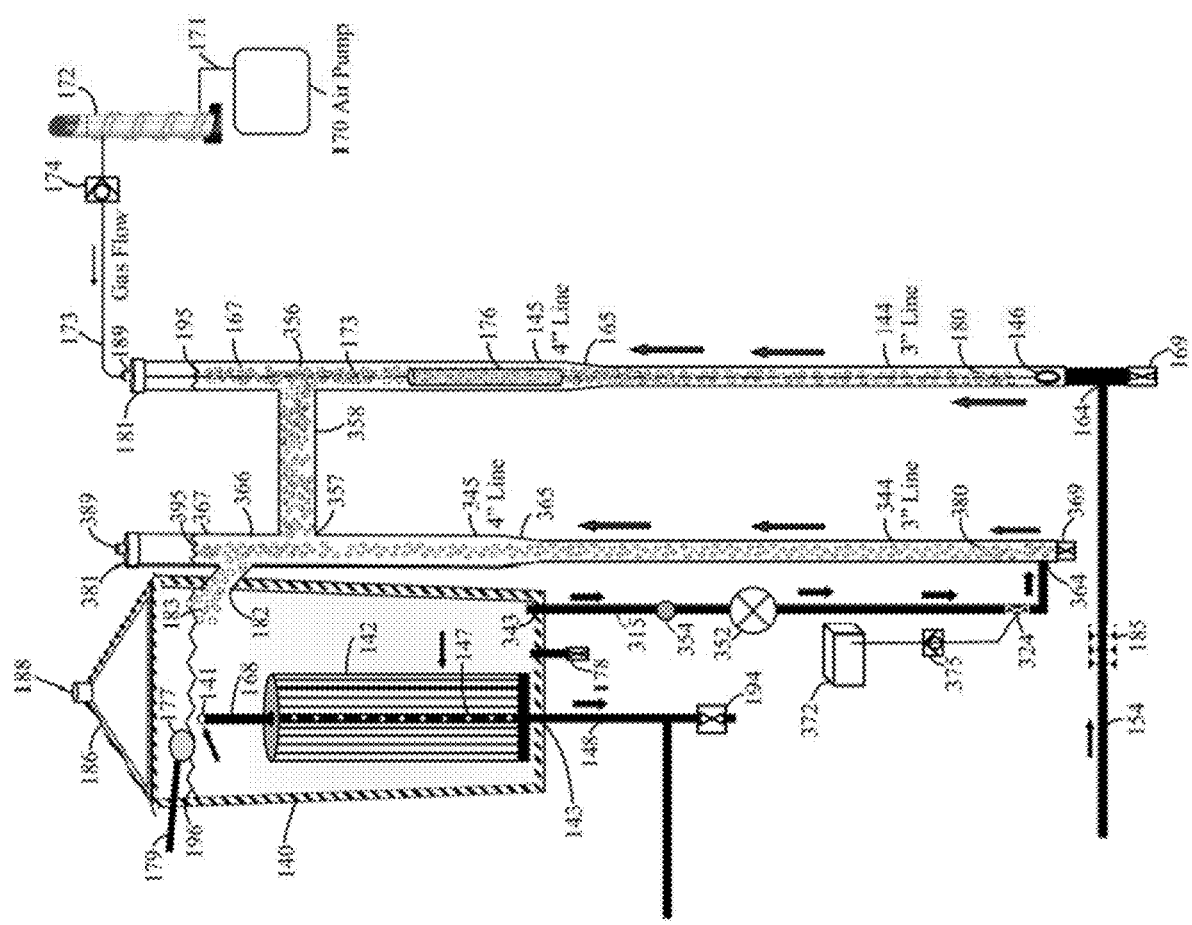
FIG. 2A illustrates an alternate embodiment of a portion of the treatment side of an ozone-assisted fluid treatment apparatus 200 as shown in FIG. 2, wherein an ozone generator and venturi are used to produce additional ozone.

FIG. 2A illustrates an alternate embodiment of a portion of the treatment side of an ozone-assisted fluid treatment apparatus 200 as shown in FIG. 2, wherein everything is the same as in FIG. 2, above, but in this case, the UV germicidal lamp 176 is switched to lift tube 145 (a 4" conduit) to disinfect the fluid and create AOPs. Unlike in FIG. 2, no UV germicidal lamp 176 is installed in conduit 345 because the treatment goal, in this embodiment FIG. 2A might be to create more and more ozone in conduit 345 so that the main fluid reservoir 102 can maintain an ozone residual which might otherwise might not be possible for some ozone generators. It is commonly assumed in the water treatment industry that corona discharge (CD) ozone generators used in combination with a venturi are capable of producing large amounts of ozone and FIG. 2A simply taps into this capability for treating large main reservoirs with heavy bather loads or difficult environmental conditions which make it difficult or impossible to maintain an ozone residual.

Figure 2B:
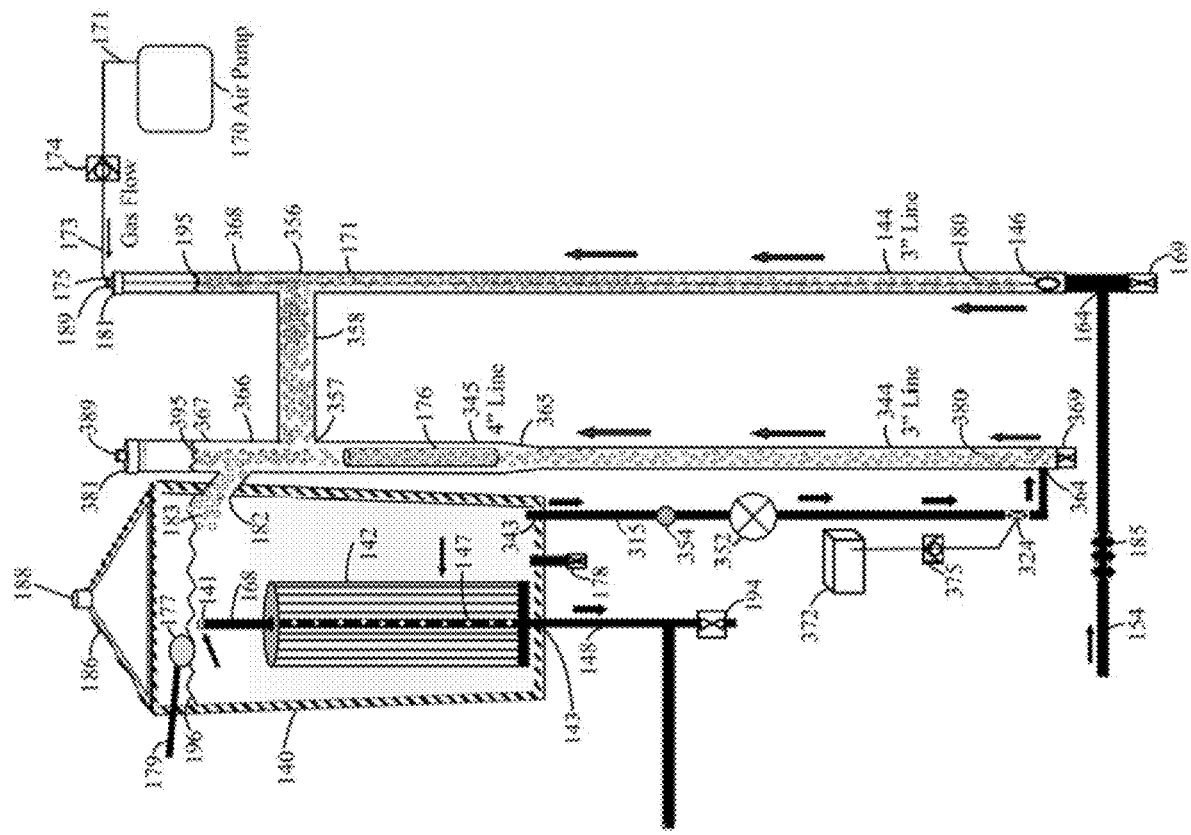
FIG. 2B illustrates an alternate embodiment of a portion of the treatment side of an ozone-assisted fluid treatment apparatus 200 as shown in FIG. 2, wherein an ozone generator and venturi are used to produce additional ozone.

FIG. 2B illustrates an alternate embodiment of a portion of the treatment side of an ozone-assisted fluid treatment apparatus 200 as shown in FIG. 2, wherein as in FIG. 2, an ozone generator 372 and venturi 324 combination is used in a continuous loop by the action of a fluid pressure pump 352, drawing water from auxiliary reservoir 140. As depicted in FIG. 2B, the sole lift tube 144 creates the motive force to circulate the fluid through the fluid treatment apparatus 200 with only pressurized air without the need for an ozone generator.

Figure 2C:
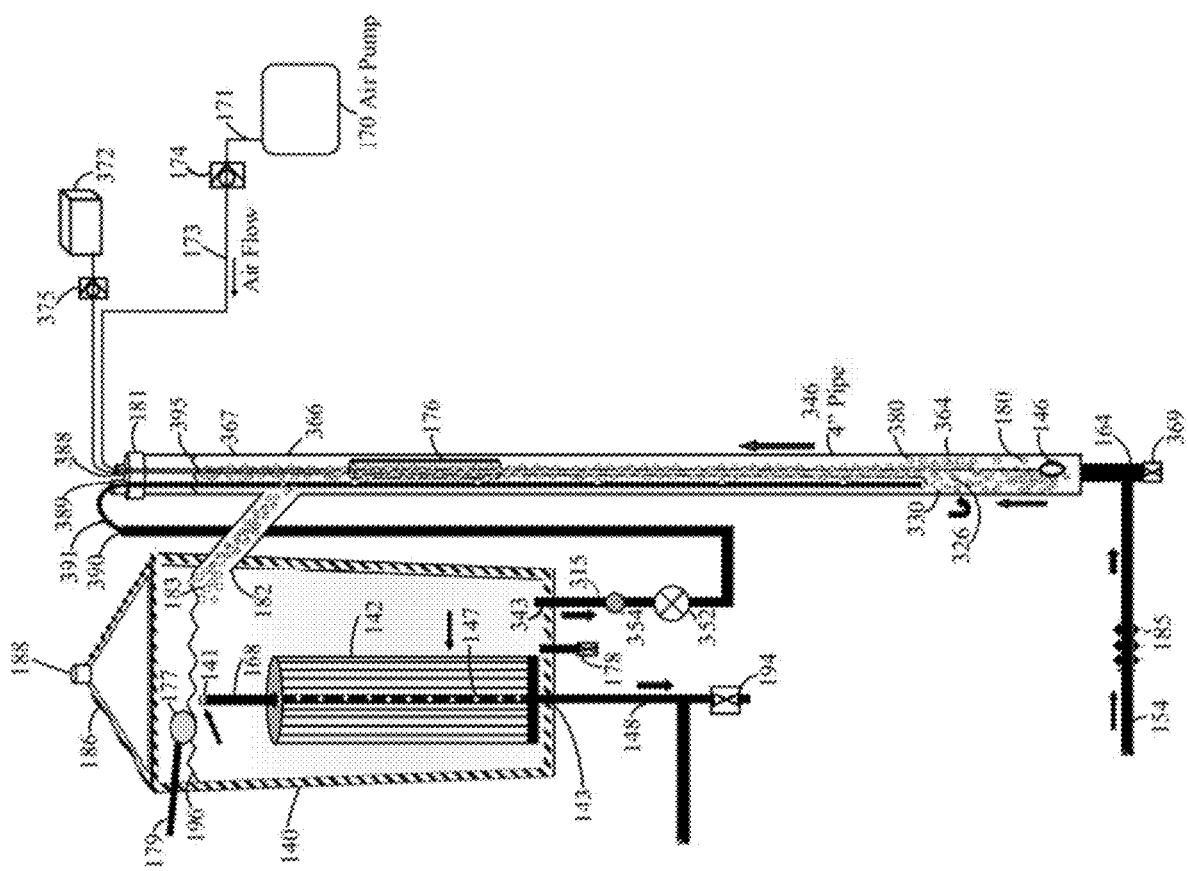
FIG. 2C illustrates an alternate embodiment of a portion of the treatment side of an ozone-assisted fluid treatment apparatus 200 as shown in FIG. 2, wherein an ozone generator and venturi are used to produce additional ozone.

FIG. 2C illustrates an alternate embodiment of a portion of the treatment side of an ozone-assisted fluid treatment apparatus 200 as shown in FIG. 2, wherein ozonated fluid is directed into lift tube 346 against a counter flow of the rising fluid by operation of an air pump 170 and diffuser stone 146 at the bottom of said lift tube 346. FIG. 2C is similar to FIG. 2, except instead of using conduit 345 to direct ozonated fluid directly to the auxiliary reservoir 140, FIG. 2C illustrates how fluid may be indirectly directed into auxiliary reservoir 140 by first directing the fluid through conduits 315 and 391 into the top of lift tube 346 through opening 389 and into a venturi 330 positioned inside the lift tube 346 towards the lower end at point 364 of lift tube 346 and supplied with ozonated air by ozone generator 372 to create ozonated fluid so that the flow of ozonated fluid coming out of the venturi 330 is pointed downwards and against the fluid and rising bubbles coming up the lift tube 346. An ozone gas line coming from ozone generator 372 supplies ozone to the venturi 330 where such ozone is drawn into the fluid to create ozonated fluid. As depicted in the arrow, the ozonated fluid and undissolved ozone gas bubbles 326 are forced to reverse course and exit the lift tube 346 in a never-ending continuous loop. As in FIG. 2, the motive force to circulate the ozonated fluid is by the function of the pressurized air supplied by air pump 170 via an airline conduit 171 which via airline 173 connects to a diffuser stone 146 in a similar fashion as in FIG. 1, above.

Figure 2D:
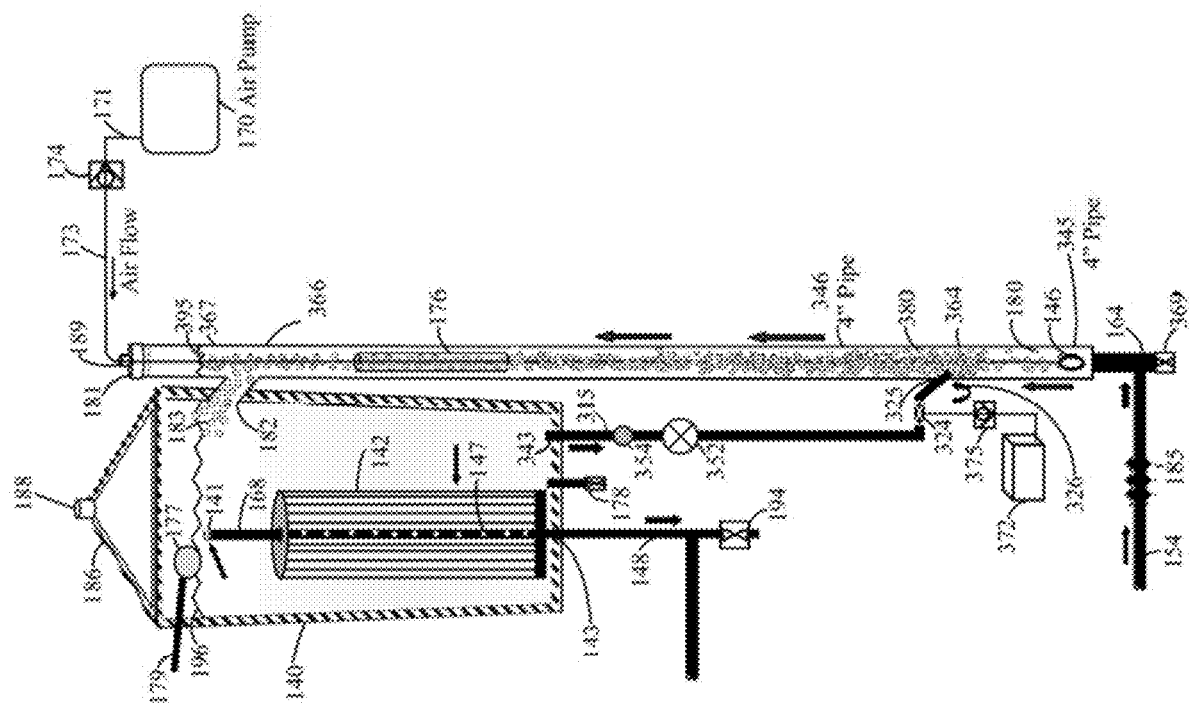
FIG. 2D illustrates an alternate embodiment of a portion of the treatment side of an ozone-assisted fluid treatment apparatus 200 as shown in FIG. 2, wherein an ozone generator and venturi are used to produce additional ozone.

FIG. 2D illustrates an alternate embodiment of a portion of the treatment side of an ozone-assisted fluid treatment apparatus 200 as shown in FIG. 2, wherein ozonated fluid is directed into a lift tube against a flow of fluid coming up the same lift tube. FIG. 2D is similar to FIG. 2, except that the ozonated fluid and undissolved ozone gas bubbles 380 are directed into the lift tube 346 at approximately a 45 degree angle at opening 325 so that they shoot downwards as in FIG. 2C and must reverse course and go up the lift tube 346 until they flow in to auxiliary reservoir 140. The fluid from auxiliary reservoir 140 is ozonated over and over again in a continuous loop. Motive force for this embodiment is supplied by the same aeration system as in FIG. 2C.

Figure 3:
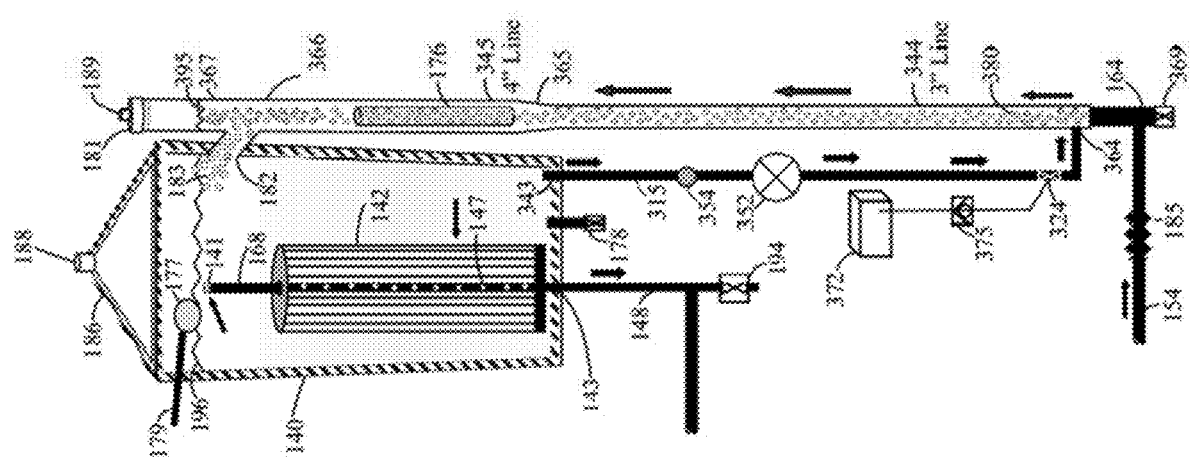
FIG. 3 illustrates an alternate embodiment of a portion of the ozone-assisted fluid treatment apparatus 300 as shown in FIG. 3, wherein ozonated fluid is directed into a lift tube and then into the auxiliary fluid reservoir.

FIG. 3 illustrates an alternate embodiment of a portion of the ozone-assisted fluid treatment apparatus 200 as shown in FIG. 2, wherein ozonated fluid produced by ozone generator 352 and venturi 324 is directed into conduits 344 and 345. Unlike FIG. 2, no motive flow is provided by an aeration system and conduits 344 and 345 are not acting as a lift tube. Rather motive force is from the operation of a conventional pressure pump 110 or auxiliary pressure pump 111. In order for the fluid to return to the main reservoir, it may require the assistance of an auxiliary pressure pump 113 as in FIG. 1H if gravity alone is not sufficient. Note that a separate pressure pump 352 provides for the fluid to circulate continuously, and with each pass, increases the amount of dissolved ozone.

Figure 4:
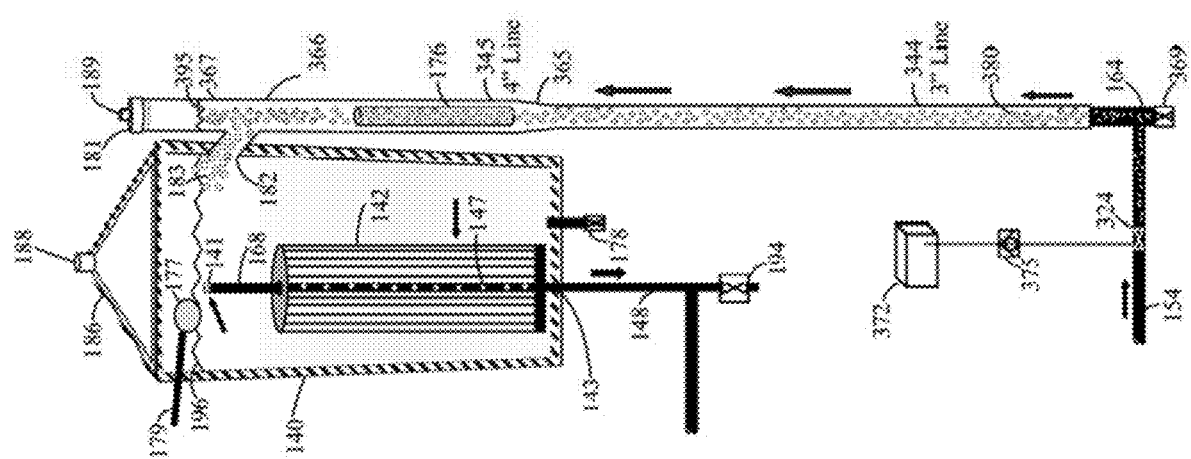
FIG. 4 illustrates an alternate embodiment of a portion of the ozone-assisted fluid treatment apparatus 400 as shown in FIG. 4, wherein ozonated fluid is directed into a lift tube and then into the auxiliary fluid reservoir.

FIG. 4 illustrates an alternate embodiment of a portion of the ozone-assisted fluid treatment apparatus 200 as shown in FIG. 2, wherein ozonated fluid is directed into conduits 344 and 345 and then into the auxiliary fluid reservoir. An in FIG. 3 above, motive force for the fluid to circulate through the fluid treatment apparatus is by action of either a conventional pressure pump 110 or auxiliary pressure pump 110 and to return to the main fluid reservoir by action of gravity. If gravity cannot overcome restrictions in shared conduits and openings in the main fluid reservoir 102, an auxiliary pressure pump 113 must be used on the return line. Note that FIG. 4 is a "one pass" ozonation embodiment by use of the pressure pumps mentioned above.

Figure 5:
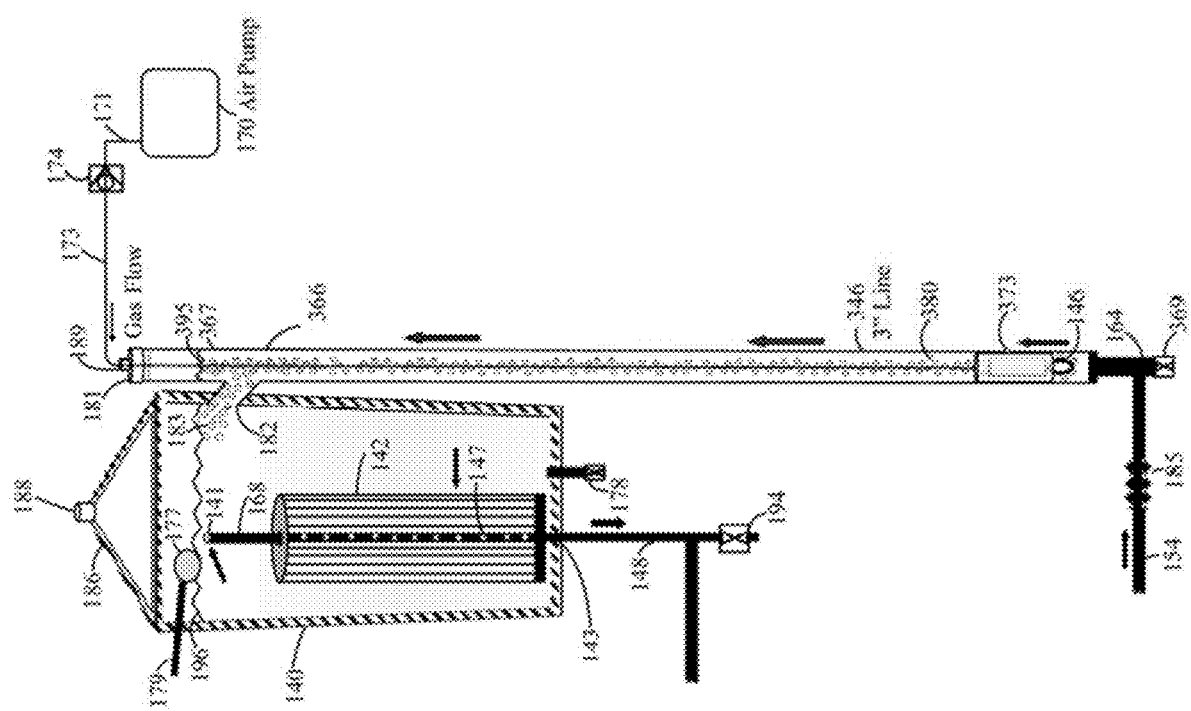
FIG. 5 illustrates an alternate embodiment of a portion of the ozone-assisted fluid treatment apparatus 500 as shown in FIG. 5, wherein ozone and a UV germicidal combination unit is placed at the bottom of a lift tube to create ozonated fluid and AOPs and thereafter directed into the auxiliary fluid reservoir via the same lift tube.

FIG. 5 illustrates an alternate embodiment of a portion of the ozone-assisted fluid treatment apparatus 500 as shown in FIG. 5, wherein ozone and a UV germicidal combination unit is placed at the bottom of a lift tube to create ozonated fluid and AOPs and thereafter directed into the auxiliary fluid reservoir via the same lift tube.

The following comments and considerations apply to FIGS. 1-5 (and the various embodiments depicted herein) where applicable:

Normally, a 5 degree slope (preferably in the direction of the fluid flow) is very helpful to prevent air from getting trapped in conduits. Trapped air acts like a valve which restricts or prevents the fluid from flowing. It may not be necessary for a given conduit to have a slope if a fluid pressure pump is to be used to create flow (instead of gravity). A slope is recommended for all conduits used for gravity flow, even those conduits which have an installed air release valve.

Bubbles of ozone gas and air (so-called ozonated air) produced by a diffuser or venturi are what is normally used, although other devices known in the art can be used to create ozonated air bubbles in lift tubes. Ozonated air can be produced by a corona discharge (CD), ultraviolet ozone lamp (UV), or other form of ozone generator known in the art. New technologies using LEDs, cold discharge, etc., if able to produce ozone, can be considered. In all installations, it is helpful to use check valves to prevent fluid from going back up air lines and into ozone generators and damaging the generators.

Concerning lift tubes, they can increase in diameter from 1.5 to 2 inches and a length of 3 meters for smaller main reservoirs, to much larger diameter lift tubes, such as 4" to 8" or even larger, and to longer lengths (4 to 6 meters) as the volume and bather loads of the main reservoir 102 increase. For larger pools, the lift tube and diffuser stones and/or venturi will need to be large as well. For example, in a pool of about 60,000 to 100,000 gallons, a 4" to 6" lift tube may be necessary or it may be necessary to use multiple sets of lift tubes and multiple auxiliary fluid reservoirs.

As the fluid treatment apparatus increases in capacity, so too must the air pumps. For larger pools requiring a larger fluid treatment system, an air pump with a capacity of about 80 to 300 liters per minute at the depth of 3.5 or 6 meters may be required. The capacity of the ozone generators must also increase. Many ozone generators are capable of generating many kilograms of ozone per hour, or per day. Auxiliary reservoirs also need to increase in size and may contain multiple low pressure filters or other filter media appropriate for the task at hand. The amount of electricity used also goes up proportionally.

The ozone-assisted fluid treatment apparatus is also appropriate for use with an aquaponics system or for an aquarium which has plants (either surface or submerged plant species). Fish require oxygen and clean water, which necessitates the removal of fish wastes and chemical compounds which are toxic (explained further below). The fluid treatment apparatus circulates, oxygenates, cleans, and disinfects the water for the fish all aquatic life. Whether by use of an air pump or venturi with filtered air, fish and other aquatic life are healthier than in other systems. If a combination of ozone and a UV germicidal lamp are used, or combined in a single unit, there is additional treatment of the water and specifically, by creating hydroxyl free radicals. Water entering the fluid treatment apparatus may be used to grow surface plants or submerged plants and the plants' ability to assimilate chemicals and other wastes produced by the fish helps the plants grow and at the same time, filters the water. An optional UV germicidal lamp may be suspended in the auxiliary reservoir 140 tank such that the water is subject to UV germicidal disinfection.

Using the fluid treatment apparatus for aquaponics, aquariums, hydroponics, aquatic farming, floating grow beds, etc., has many advantages, especially the oxygenation and filtration of the water. Further treatment with ozone and UV germicidal disinfection will enhance the water quality. A water pump usually does not oxygenate the water as efficiently, although there are designs using a venturi to inject air into a water stream and other methods to oxygenate the water such as causing water to "splash" down upon the main reservoir. However, using a water pump for the purposes of aeration is not as efficient or complete as using an air pump designed for that purpose.

The foregoing descriptions of various specific embodiments in accordance with the invention have been presented for purposes of illustration and description. They are not intended to be exhaustive or to limit the invention to the precise forms disclosed, and many modifications and variations are possible in light of the above teaching. The invention is to be construed according to the following claims and their equivalents.

What is claimed is:

1. In a fluid treatment system for filtering fluid in a main fluid reservoir, said fluid treatment system comprising a high pressure fluid pump, a high pressure filter, an input conduit for coupling fluid from said main fluid reservoir to said high pressure fluid pump, a pump output conduit for coupling fluid from said high pressure fluid pump to said high pressure filter, and an output conduit for coupling fluid from said high pressure filter back to said main fluid reservoir, an apparatus for ozone-aerating and filtering fluid flowing in said fluid treatment system comprising:

an auxiliary fluid reservoir positioned adjacent to and outside of the main fluid reservoir;

a lift tube positioned outside of the main fluid reservoir and having an upper end and a lower end, said lift tube upper end open within the auxiliary fluid reservoir, said lift tube extending below the auxiliary fluid reservoir a predetermined length;

a first valve inserted in said output conduit for controlling the fluid flow in said output conduit;

a first conduit connected between said auxiliary fluid reservoir and said output conduit on the downstream side of said first valve for enabling fluid in the auxiliary fluid reservoir to flow into the downstream side of said output conduit;

a second conduit connected at one end to said output conduit on the upstream side of said first valve and connected at its other end to the lower end of said lift tube;

a second valve inserted in said second conduit for metering the flow of fluid in said second conduit for enabling fluid to flow by gravity from the upstream side of said high pressure filter output conduit into the lower end of said lift tube;

means for injecting ozonated air bubbles into the fluid at the lower end of said lift tube, to cause the ozonated air bubbles to ozone-aerate the fluid in said lift tube and to cause the fluid in said lift tube to flow up said lift tube and into the auxiliary fluid reservoir due to the expansion of the ozonated air as it bubbles up said lift tube, said auxiliary fluid reservoir positioned such that the level of fluid in the auxiliary fluid reservoir is thereby caused to rise higher than the level of fluid in the main fluid reservoir, such that ozone-aerated fluid in the auxiliary fluid reservoir is caused to flow by gravity into said first conduit, into the downstream side of said output conduit, and back into the main fluid reservoir; and a low pressure fluid filter positioned in the fluid path formed by said first and second conduits, said lift tube, and said auxiliary fluid reservoir, for filtering the fluid flowing therein.

2. The fluid treatment system of claim 1, further comprising a UV germicidal lamp positioned in the fluid path comprising said second conduit, said lift tube, said auxiliary reservoir and said first conduit.

3. The fluid treatment system of claim 2 wherein said UV germicidal lamp is positioned in said lift tube.

4. The fluid treatment system of claim 2 wherein said UV germicidal lamp is positioned in said first conduit.

5. The fluid treatment system of claim 1, wherein said means for injecting ozonated air bubbles into the fluid in said lint tube comprises a diffuser positioned inside said lift tube at its lower end.

6. The fluid treatment system of claim 5, wherein said diffuser is inserted into said lift tube at its upper end.

7. The fluid treatment system of claim 1, wherein said means for injecting ozonated air bubbles into the fluid in said lift tube comprises a corona discharge (CD) ozone generator whose output is coupled to a venturi for injecting ozonated air into the fluid flowing into bottom of said lift tube.

8. The fluid treatment system of claim 7, wherein said venturi is positioned in said second conduit.

9. The fluid treatment system of claim 7, wherein said venturi is positioned at the lower end of said lift tube.

10. The fluid treatment system of claim 1, wherein said low pressure fluid filter is positioned inside said auxiliary fluid reservoir to filter the ozone-aerated fluid before the fluid enters said first conduit.

11. The fluid treatment system of claim 1 further comprising an out-flow valve in said first conduit and a low pressure fluid pump to control the flow of ozone-aerated fluid from the auxiliary fluid reservoir to said output conduit.

12. The fluid treatment system of claim 1 further comprising:

a third conduit connected between the pump output conduit and said second conduit downstream of said second valve; and a third valve positioned in said third conduit for controlling the flow of fluid in said third conduit.

13. The fluid treatment system of claim 1 further comprising a second auxiliary reservoir connected between said second conduit and the lower end of said lift tube whose fluid level is visible to a user, said second auxiliary reservoir positioned with respect to said main fluid reservoir and said auxiliary fluid reservoir to enable the user to adjust the level of fluid in said second auxiliary reservoir using said first and second valves.

14. The fluid treatment system of claim 1 further comprising:
- a third conduit connected at one end to said auxiliary fluid reservoir positioned to extend downward from the auxiliary fluid reservoir to enable fluid in said auxiliary fluid reservoir to flow into said third conduit;
- a fourth conduit whose lower end is connected to the other end of said third conduit and whose upper end is connected to said auxiliary fluid reservoir to enable fluid in said fourth conduit to flow back up and into said auxiliary fluid reservoir;
- a pump positioned in said third conduit for causing fluid to flow from said auxiliary fluid reservoir into said third conduit, up said fourth conduit, and back into said auxiliary reservoir;
- a third valve for controlling fluid flow in said third conduit;
- a corona discharge (CD) ozone generator; and
- venturi connected between the output of said CD ozone generator and said third conduit for causing ozonated air to be injected into the fluid flowing in said third conduit.

15. The fluid treatment system of claim 14 further comprising a UV germicidal lamp positioned in said fourth conduit.

16. The fluid treatment system of claim 1 further comprising an ozone-capturing device positioned above said auxiliary fluid reservoir for capturing undissolved excess ozone gas emanating from the fluid in said auxiliary fluid reservoir.

17. The fluid treatment system of claim 1, wherein the filtering surfaces of said low pressure fluid filter support a filtering layer of bio-film comprising organic material.

18. In a fluid treatment system for filtering fluid in a main fluid reservoir, said fluid treatment system comprising a high pressure fluid pump, a high pressure filter, an input conduit for coupling fluid from said main fluid reservoir to said high pressure fluid pump, a pump output conduit for coupling fluid from said high pressure fluid pump to said high pressure filter, and an output conduit for coupling fluid from said high pressure filter back to said main fluid reservoir, a method for ozone-aerating and filtering fluid flowing in said fluid treatment system comprising:
- causing a controlled amount of fluid in said output conduit to be coupled to the bottom of a lift tube via a second conduit;
- injecting ozonated air into said lift tube at or near its bottom to cause the fluid in said lift tube to flow up said lift tube and into an auxiliary reservoir, and to cause the fluid in said lift tube to absorb some of the ozone in said ozonated air;
- collecting said ozonated fluid in said auxiliary reservoir; and
- causing said fluid in said auxiliary reservoir to flow by gravity back into the main fluid reservoir via a first conduit connected between said auxiliary reservoir and said output conduit downstream of where fluid flows from said output conduit to said lift tube.

19. The method of claim 18 wherein a first valve is used to control the flow of fluid said output conduit between where fluid is caused to flow to the bottom of said lift tube and where the first conduit is connected to said output conduit, and wherein the step of causing a controlled amount of fluid in said output conduit to be coupled to the bottom of said lift tube comprises a second valve.

20. The method of claim 18 wherein a UV germicidal lamp is positioned in the fluid path comprising said second conduit, said tube, said auxiliary reservoir, and said first conduit.

21. The method of claim 20 wherein said UV germicidal lamp is positioned in said lift tube.

* * * * *